(12) United States Patent
Cano et al.

(10) Patent No.: US 10,860,567 B2
(45) Date of Patent: *Dec. 8, 2020

(54) STORING STATE IN A DYNAMIC CONTENT ROUTING NETWORK

(71) Applicant: Zarbaña Digital Fund LLC, Wilmington, DE (US)

(72) Inventors: Charles E. Cano, San Francisco, CA (US); Jeff Grimes, San Francisco, CA (US)

(73) Assignee: Zarbaña Digital Fund LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/128,761

(22) Filed: Sep. 12, 2018

(65) Prior Publication Data

US 2019/0146963 A1     May 16, 2019

Related U.S. Application Data

(63) Continuation of application No. 15/473,835, filed on Mar. 30, 2017, now abandoned, which is a
(Continued)

(51) Int. Cl.
*G06F 3/00*       (2006.01)
*G06F 16/23*      (2019.01)
(Continued)

(52) U.S. Cl.
CPC .............. *G06F 16/23* (2019.01); *G06F 9/54* (2013.01); *H04L 67/02* (2013.01);
(Continued)

(58) Field of Classification Search
CPC ....................................................... G06F 9/54
(Continued)

(56) References Cited

U.S. PATENT DOCUMENTS 4,694,396 A  *  9/1987  Weisshaar ........ G05B 19/41845
                                                709/230
5,077,665 A     12/1991  Silverman et al.
(Continued)

FOREIGN PATENT DOCUMENTS

EP     0733983 A2    9/1996
EP     0749081 A1    12/1996
(Continued)

OTHER PUBLICATIONS

Chia-Hsin Huang, Prefiltering Techniques for Efficient XML Document Processing. (Year: 2005).*
(Continued)

*Primary Examiner* — Lechi Truong
(74) *Attorney, Agent, or Firm* — Brundidge & Stanger, P.C.

(57) ABSTRACT

A client module of an object state storage is configured to identify a live object at a client. The client module is further configured to receive an update message for the live object from storage, the update message is stored by an object ID associated with the live object, and the update message allowing the property to be updated for the live object at the client in real-time. The client module is further configured to transmit the update message for the live object to the client.

18 Claims, 9 Drawing Sheets

Related U.S. Application Data continuation of application No. 13/941,131, filed on Jul. 12, 2013, now Pat. No. 9,613,076, which is a continuation of application No. 11/515,366, filed on Aug. 31, 2006, now Pat. No. 8,505,024, which is a continuation of application No. 10/213,269, filed on Aug. 5, 2002, now Pat. No. 7,127,720, which is a continuation-in-part of application No. 10/017,182, filed on Dec. 14, 2001, now Pat. No. 7,043,525.

(60) Provisional application No. 60/280,627, filed on Mar. 29, 2001, provisional application No. 60/279,608, filed on Mar. 28, 2001, provisional application No. 60/278,303, filed on Mar. 21, 2001, provisional application No. 60/276,847, filed on Mar. 16, 2001, provisional application No. 60/256,613, filed on Dec. 18, 2000.

(51) Int. Cl.
  *G06F 9/54* (2006.01)
  *H04L 29/08* (2006.01)

(52) U.S. Cl.
  CPC ...... *H04L 67/1002* (2013.01); *H04L 67/1095* (2013.01); *H04L 67/327* (2013.01)

(58) Field of Classification Search
  USPC .......................................................... 719/310
  See application file for complete search history.

(56) References Cited

U.S. PATENT DOCUMENTS

| | | | |
|---|---|---|---|
| 5,230,048 | A | 7/1993 | Moy |
| 5,517,657 | A * | 5/1996 | Rodgers .............. G06F 9/30101 711/169 |
| 5,535,335 | A | 7/1996 | Cox et al. |
| 5,655,152 | A | 8/1997 | Ohnishi et al. |
| 5,659,687 | A | 8/1997 | Kim et al. |
| 5,692,193 | A | 11/1997 | Jagannathan et al. |
| 5,699,523 | A | 12/1997 | Li et al. |
| 5,706,516 | A | 1/1998 | Chang et al. |
| 5,732,219 | A | 3/1998 | Blumer et al. |
| 5,740,549 | A | 4/1998 | Reilly et al. |
| 5,754,173 | A | 5/1998 | Hiura et al. |
| 5,754,939 | A | 5/1998 | Herz et al. |
| 5,764,890 | A | 6/1998 | Glasser et al. |
| 5,805,803 | A | 9/1998 | Birrell et al. |
| 5,815,649 | A | 9/1998 | Utter et al. |
| 5,819,284 | A | 10/1998 | Farber et al. |
| 5,822,543 | A | 10/1998 | Dunn et al. |
| 5,835,087 | A | 11/1998 | Herz |
| 5,845,324 | A | 12/1998 | White et al. |
| 5,878,420 | A | 3/1999 | de la Salle |
| 5,886,643 | A | 3/1999 | Diebboll et al. |
| 5,919,247 | A | 7/1999 | Van Hoff et al. |
| 5,933,429 | A | 8/1999 | Bubenik et al. |
| 5,938,733 | A | 8/1999 | Heimsoth et al. |
| 5,964,839 | A | 10/1999 | Johnson et al. |
| 5,970,488 | A | 10/1999 | Crowe et al. |
| 5,974,457 | A | 10/1999 | Waclawsky et al. |
| 5,987,480 | A | 11/1999 | Donohue et al. |
| 6,018,619 | A | 1/2000 | Allard et al. |
| 6,029,175 | A | 2/2000 | Chow et al. |
| 6,051,032 | A * | 4/2000 | Harrison .................. G06F 8/61 717/170 |
| 6,052,447 | A | 4/2000 | Golden et al. |
| 6,055,493 | A | 4/2000 | Ries et al. |
| 6,091,724 | A | 7/2000 | Chandra et al. |
| 6,094,681 | A | 7/2000 | Shaffer et al. |
| 6,112,240 | A | 8/2000 | Pogue et al. |
| 6,138,158 | A | 10/2000 | Boyle et al. |
| 6,173,406 | B1 | 1/2001 | Wang et al. |
| 6,233,600 | B1 | 5/2001 | Salas et al. |
| 6,240,451 | B1 | 5/2001 | Campbell et al. |
| 6,240,462 | B1 | 5/2001 | Agraharam et al. |
| 6,253,167 | B1 | 6/2001 | Matsuda et al. |
| 6,256,747 | B1 | 7/2001 | Inohara et al. |
| 6,269,080 | B1 | 7/2001 | Kumar |
| 6,292,835 | B1 | 9/2001 | Huang et al. |
| 6,308,209 | B1 | 10/2001 | Lecheler |
| 6,314,459 | B1 | 11/2001 | Freeman |
| 6,324,587 | B1 * | 11/2001 | Trenbeath ............. H04L 63/105 709/206 |
| 6,363,421 | B2 | 3/2002 | Barker et al. |
| 6,366,926 | B1 | 4/2002 | Pohlmann et al. |
| 6,405,245 | B1 | 6/2002 | Burson et al. |
| 6,408,282 | B1 | 6/2002 | Buist |
| 6,418,448 | B1 | 7/2002 | Sarkar |
| 6,418,467 | B1 | 7/2002 | Schweitzer et al. |
| 6,446,257 | B1 | 9/2002 | Pradhan et al. |
| 6,449,638 | B1 | 9/2002 | Wecker et al. |
| 6,460,036 | B1 | 10/2002 | Herz |
| 6,480,833 | B2 | 11/2002 | Tsutsumitake |
| 6,484,143 | B1 | 11/2002 | Swildens et al. |
| 6,502,131 | B1 | 12/2002 | Vaid et al. |
| 6,510,323 | B1 | 1/2003 | Stocker et al. |
| 6,539,427 | B1 | 3/2003 | Natarajan et al. |
| 6,553,413 | B1 | 4/2003 | Leighton et al. |
| 6,560,611 | B1 | 5/2003 | Nine et al. |
| 6,567,411 | B2 | 5/2003 | Dahlen |
| 6,577,328 | B2 | 6/2003 | Matsuda et al. |
| 6,606,596 | B1 | 8/2003 | Zirngibl et al. |
| 6,606,643 | B1 | 8/2003 | Michael et al. |
| 6,609,138 | B1 | 8/2003 | Merriam |
| 6,654,804 | B1 | 11/2003 | Fleming |
| 6,658,652 | B1 | 12/2003 | Alexandria et al. |
| 6,687,729 | B1 | 2/2004 | Sievert et al. |
| 6,691,165 | B1 | 2/2004 | Bruck et al. |
| 6,721,740 | B1 | 4/2004 | Skinner et al. |
| 6,725,446 | B1 | 4/2004 | Hahn et al. |
| 6,728,747 | B1 | 4/2004 | Jenkins et al. |
| 6,745,224 | B1 | 6/2004 | D'Souza et al. |
| 6,746,601 | B2 | 6/2004 | Dorin et al. |
| 6,751,663 | B1 | 6/2004 | Farrell et al. |
| 6,760,324 | B1 | 7/2004 | Scott et al. |
| 6,769,009 | B1 | 7/2004 | Reisman |
| 6,789,115 | B1 | 9/2004 | Singer et al. |
| 6,792,458 | B1 | 9/2004 | Muret et al. |
| 6,823,359 | B1 | 11/2004 | Heidingsfeld et al. |
| 6,829,642 | B1 | 12/2004 | Didier et al. |
| 6,832,222 | B1 | 12/2004 | Zimowski |
| 6,836,886 | B2 | 12/2004 | Tuerke et al. |
| 6,871,346 | B1 | 3/2005 | Kumbalimutt et al. |
| 6,918,084 | B1 | 7/2005 | Slaughter et al. |
| 6,970,924 | B1 | 11/2005 | Chu et al. |
| 7,020,082 | B2 | 3/2006 | Bhagabath et al. |
| 7,043,525 | B2 | 5/2006 | Tuttle et al. |
| 7,051,070 | B2 | 5/2006 | Tuttle et al. |
| 7,099,926 | B1 | 8/2006 | Ims et al. |
| 7,107,326 | B1 | 9/2006 | Fijolek et al. |
| 7,127,720 | B2 | 10/2006 | Cano et al. |
| 7,139,844 | B2 | 11/2006 | Smith et al. |
| 7,159,034 | B1 | 1/2007 | Rai |
| 7,206,805 | B1 | 4/2007 | McLaughlin, Jr. |
| 7,207,043 | B2 | 4/2007 | Blythe et al. |
| 7,209,959 | B1 | 4/2007 | Campbell et al. |
| 7,249,197 | B1 | 7/2007 | Roestenburg et al. |
| 7,263,547 | B2 | 8/2007 | Kloba et al. |
| 7,277,917 | B2 | 10/2007 | Tuttle et al. |
| 7,293,074 | B1 | 11/2007 | Jellinek et al. |
| 7,327,683 | B2 | 2/2008 | Ogier et al. |
| 7,350,213 | B2 | 3/2008 | Deutesfeld et al. |
| 7,412,518 | B1 | 8/2008 | Duigou et al. |
| 7,426,721 | B1 | 9/2008 | Saulpaugh et al. |
| 7,430,610 | B2 | 9/2008 | Pace et al. |
| 7,516,177 | B2 | 4/2009 | Knapp et al. |
| 7,551,913 | B1 | 6/2009 | Chien |
| 7,565,359 | B2 | 7/2009 | Nazem et al. |
| 7,668,164 | B2 | 2/2010 | Jonsson |
| 7,725,596 | B2 | 5/2010 | Garcia-Luna-Aceves et al. |
| 7,814,225 | B2 | 10/2010 | Rumelhart |
| 7,930,362 | B2 | 4/2011 | Rumelhart |

(56) References Cited

U.S. PATENT DOCUMENTS

| | | | |
|---|---|---|---|
| 8,407,722 | B2 | 3/2013 | Tuttle et al. |
| 8,505,024 | B2 | 8/2013 | Cano et al. |
| 2001/0012299 | A1 | 8/2001 | Dahlen |
| 2001/0047426 | A1 | 11/2001 | Hunter |
| 2002/0010757 | A1 | 1/2002 | Granik et al. |
| 2002/0013852 | A1 | 1/2002 | Janik |
| 2002/0024536 | A1 | 2/2002 | Kahan et al. |
| 2002/0056004 | A1 | 5/2002 | Smith et al. |
| 2002/0062325 | A1 | 5/2002 | Berger et al. |
| 2002/0073165 | A1 | 6/2002 | McNulty et al. |
| 2002/0078251 | A1 | 6/2002 | Lewis |
| 2002/0087630 | A1 | 7/2002 | Wu |
| 2002/0091736 | A1 | 7/2002 | Wall |
| 2002/0095399 | A1 | 7/2002 | Devine et al. |
| 2002/0120717 | A1 | 8/2002 | Giotta |
| 2002/0123359 | A1 | 9/2002 | Wei et al. |
| 2002/0123993 | A1* | 9/2002 | Chau ..................... G06F 16/86 |
| 2002/0165977 | A1 | 11/2002 | Novaes |
| 2003/0023755 | A1 | 1/2003 | Harris et al. |
| 2003/0026254 | A1 | 2/2003 | Sim |
| 2003/0041110 | A1 | 2/2003 | Wenocur et al. |
| 2003/0120817 | A1 | 6/2003 | Ott et al. |
| 2003/0140111 | A1 | 7/2003 | Pace et al. |
| 2004/0139433 | A1 | 7/2004 | Blythe et al. |
| 2004/0148606 | A1 | 7/2004 | Hosoe |
| 2004/0199926 | A1 | 10/2004 | Gilgen et al. |
| 2004/0215493 | A1 | 10/2004 | Koppes et al. |
| 2005/0027815 | A1 | 2/2005 | Christodoulou et al. |
| 2005/0033841 | A1 | 2/2005 | McCarthy et al. |
| 2005/0125557 | A1 | 6/2005 | Vasudevan et al. |
| 2006/0041681 | A1 | 2/2006 | Rumelhart |
| 2006/0075279 | A1 | 4/2006 | Cameros et al. |
| 2006/0117318 | A1 | 6/2006 | Rumelhart et al. |
| 2006/0265488 | A1 | 11/2006 | Tuttle et al. |
| 2007/0033293 | A1 | 2/2007 | Rumelhart |
| 2007/0061811 | A1 | 3/2007 | Rumelhart et al. |
| 2009/0077173 | A1 | 3/2009 | Lowery et al. |
| 2011/0161458 | A1 | 6/2011 | Rumelhart |
| 2013/0060895 | A1 | 3/2013 | Tuttle et al. |

FOREIGN PATENT DOCUMENTS

| | | |
|---|---|---|
| EP | 0889421 A1 | 1/1999 |
| JP | 2000020423 A | 1/2000 |
| JP | 2002055906 A | 2/2002 |
| JP | 2008515032 A | 5/2008 |
| WO | 9716796 A1 | 5/1997 |
| WO | 0163837 A2 | 8/2001 |
| WO | 2005046184 A1 | 5/2005 |
| WO | 2006023459 A1 | 3/2006 |

OTHER PUBLICATIONS

Written Opinion of the International Searching Authority for International Application No. PCT/US2005/029158, recorded Jan. 25, 2006, 7 pages.
Zhao et al.; "A Workflow-centric Study of Organizational Knowledge Distribution; Proceedings of the 33rd Hawaii International Conference on System Sciences;" Jan. 2000; pp. 1-10, IEEE.
Non-Final Office Rejection dated May 3, 2005 for U.S. Appl. No. 10/017,182, filed Dec. 14, 2001; 8 pages.
Notice of Allowance dated Nov. 10, 2005, for U.S. Appl. No. 10/017,182, filed Dec. 14, 2001; 6 pages.
Notice of Allowance dated Jul. 5, 2005 for U.S. Appl. No. 10/105,018, filed Mar. 21, 2002; 7 pages.
Notice of Allowance dated Jan. 3, 2006 for U.S. Appl. No. 10/105,018, filed Mar. 21, 2002; 4 pages.
Non-final Rejection dated Aug. 9, 2005 for U.S. Appl. No. 10/213,269, filed Aug. 5, 2002; 11 pages.
Final Rejection dated Jan. 26, 2006 for U.S. Appl. No. 10/213,269, filed Aug. 5, 2002; 8 pages.
Notice of Allowance dated Jun. 6, 2006 for U.S. Appl. No. 10/213,269, filed Aug. 5, 2002; 11 pages.
Non-final Rejection dated Jul. 23, 2009 for U.S. Appl. No. 11/396,251, filed Mar. 30, 2006, 20 pages.
Non-final Rejection dated Jan. 19, 2010 for U.S. Appl. No. 11/396,251, filed Mar. 30, 2006, 23 pages.
Final Rejection dated Jun. 17, 2010 for U.S. Appl. No. 11/396,251, filed Mar. 30, 2006, 35 pages.
Non-Final Rejection dated Oct. 26, 2010 for U.S. Appl. No. 11/396,251, filed Mar. 30, 2006; 37 pages.
Final Rejection dated Mar. 23, 2011 for U.S. Appl. No. 11/396,251, filed Mar. 30, 2006; 42 pages.
Non-Final Rejection dated Aug. 3, 2011 for U.S. Appl. No. 11/396,251, filed Mar. 30, 2006; 41 pages.
Final Rejection dated Dec. 30, 2011 for U.S. Appl. No. 11/396,251, filed Mar. 30, 2006; 48 pages.
Notice of Allowance dated Aug. 13, 2012 for U.S. Appl. No. 11/396,251, filed Mar. 30, 2006; 24 pages.
Notice of Allowance dated Jan. 7, 2013 for U.S. Appl. No. 11/396,251, filed Mar. 30, 2006; 7 pages.
Non-Final Rejection dated Feb. 3, 2009 for U.S. Appl. No. 11/205,233, filed Aug. 15, 2005; 33 pages.
Non-Final Rejection dated Aug. 6, 2009 for U.S. Appl. No. 11/205,233, filed Aug. 15, 2005; 33 pages.
Non-Final Rejection dated Jan. 7, 2010 for U.S. Appl. No. 11/205,233, filed Aug. 15, 2005; 10 pages.
Non-Final Rejection dated Mar. 6, 2009 for U.S. Appl. No. 11/515,233, filed Aug. 31, 2006; 10 pages.
Final Rejection dated Oct. 7, 2009 for U.S. Appl. No. 11/515,233, filed Aug. 31, 2006; 17 pages.
Non-Final Rejection dated Feb. 22, 2010 for U.S. Appl. No. 11/515,233, filed Aug. 31, 2006; 14 pages.
Non-Final Rejection dated Apr. 22, 2008 for U.S. Appl. No. 11/205,237, filed Aug. 15, 2005; 19 pages.
Final Rejection dated Nov. 25, 2008 for U.S. Appl. No. 11/205,237, filed Aug. 15, 2005; 21 pages.
Non-Final Rejection dated Apr. 29, 2009 for U.S. Appl. No. 11/205,237, filed Aug. 15, 2005; 22 pages.
Final Rejection dated Nov. 24, 2009 for U.S. Appl. No. 11/205,237, filed Aug. 15, 2005; 27 pages.
Non-Final Rejection dated Jan. 26, 2007 for U.S. Appl. No. 11/347,802, filed Feb. 3, 2006; 7 pages.
Notice of Allowance dated May 22, 2007 for U.S. Appl. No. 11/347,802, filed Feb. 3, 2006; 7 pages.
Non-final Rejection dated Oct. 26, 2009 for U.S. Appl. No. 11/205,263, filed Aug. 15, 2005; 17 pages.
Final Rejection dated Mar. 23, 2010 for U.S. Appl. No. 11/205,263, filed Aug. 15, 2005; 22 pages.
Non-Final Rejection dated Aug. 26, 2010 for U.S. Appl. No. 11/515,366, filed Aug. 31, 2006; 15 pages.
Final Rejection dated Feb. 17, 2011 for U.S. Appl. No. 11/515,366, filed Aug. 31, 2006; 29 pages.
Notice of Allowance dated Apr. 1, 2013 for U.S. Appl. No. 11/515,366, filed Aug. 31, 2006; 16 pages.
Supplemental Notice of Allowance dated Apr. 15, 2013 for U.S. Appl. No. 11/515,366, filed Aug. 31, 2006; 2 pages.
Non-Final Rejection dated May 28, 2013 for U.S. Appl. No. 13/617,168, filed Sep. 14, 2012; 24 pages.
Stephen Kent, Secure Border Gateway Protocoi(S-BGP), Apr. 2000.
Non-Final Office Action dated Feb. 3, 2009, U.S. Appl. No. 11/205,233, filed Aug. 15, 2005, 32 pages.
Non-Final Office Action dated Aug. 6, 2009, U.S. Appl. No. 11/205,233, filed Aug. 15, 2005, 32 pages.
Non-Final Office Action dated Jan. 7, 2010, U.S. Appl. No. 11/205,233, filed Aug. 15, 2005, 9 pages.
Notice of Allowance dated Oct. 15, 2010, U.S. Appl. No. 11/205,233, filed Aug. 15, 2005, 11 pages.
Notice of Allowance dated Dec. 29, 2010, U.S. Appl. No. 11/205,233, filed Aug. 15, 2005, 4 pages.
Non-final Office Action dated Mar. 6, 2009, U.S. Appl. No. 11/515,233, filed Aug. 31, 2006, 9 pages.
Final Office Action dated Oct. 7, 2009, U.S. Appl. No. 11/515,233, filed Aug. 31, 2006, 16 pages.
Non-final Office Action dated Feb. 22, 2010, U.S. Appl. No. 11/515,233, filed Aug. 31, 2006, 13 pages.

(56) References Cited

OTHER PUBLICATIONS

Notice of Allowance dated Aug. 5, 2010, U.S. Appl. No. 11/515,233, filed Aug. 31, 2006, 13 pages.
Non-final Office Action dated Mar. 29, 2012, U.S. Appl. No. 13/042,883, filed Mar. 8, 2011, 16 pages.
Non-final Office Action dated Jan. 2, 2013, U.S. Appl. No. 13/042,883, filed Mar. 8, 2011, 12 pages.
Non-final Office Action dated Aug. 5, 2013, U.S. Appl. No. 13/042,883, filed Mar. 8, 2011, 15 pages.
Non-final Office Action dated Nov. 8, 2014, U.S. Appl. No. 13/042,883, filed Mar. 8, 2011, 10 pages.
Final Office Action dated Jul. 7, 2014, U.S. Appl. No. 13/042,883, filed Mar. 8, 2011, 10 pages.
Notice of Allowance dated Nov. 5, 2014 for U.S. Appl. No. 13/617,168, filed Sep. 14, 2012, 7 pages.
Office Action dated Oct. 9, 2009, Chinese App. No. 200580027962.5, 16 pages.
Office Action dated Dec. 1, 2010, Japanese App. No. 2007-527921, 4 pages.
Decision of Rejection dated Mar. 28, 2011, Japanese App. No. 2007-527921, 5 pages.
English-Language Abstract for Japanese Patent Publication No. 2002-055906 A, published Feb. 20, 2002; 1 page.
Non-Final Office Action dated May 2, 2014 for U.S. Appl. No. 13/617,168, filed Sep. 14, 2012, 23 pages.
Final Rejection dated Nov. 8, 2013 for U.S. Appl. No. 13/617,168, filed Sep. 14, 2012; 22 pages.
U.S. Appl. No. 09/901,582, Timothy Tuttle, "Upstream Delivery of Information in a Digital Network," filed Jul. 9, 2001.
Aksoy et al., "Research in Data Broadcast and Dissemination", Proc. 1st Int'l Conf. on Advanced Multimedia Content Processing, Osaka University, Osaka, Japan, Nov. 1998.
Aguilera et al., "Efficient Atomic Broadcast Using Deterministic Merge," Symposium on Principles of Distributed Computing, 2000, 10 pages.
Aguilera et al., "Matching Events in a Content-based Subscription System," Eighteenth ACM Symposium on Principles of Distributed Computing (PODC '99), Atlanta, GA, May 4-6, 1999, 9 pages.
Banavar et al., "A Case for Message Oriented Middleware," Distributed Computing, 13.sup.th International Symposium, Bratislava, Slavak Republic, Sep. 27-29, 1999, 18 pages.
Banavar et al., "An Efficient Multicast Protocol for Content-Based Publish-Subscribe Systems," Proc. of the 19th International Conference on Distributed Computing Systems, 1999, 9 pages.
Banavar et al., "Information Flow Based Event Distribution Middleware," Proceedings of the 1999 ICDCS Workshop on Electronic Commerce and Web-Based Applications, 1999, 8 pages.
Caplin Systems Ltd., White Paper "Real Time Text Protocol (RTTP)," Version 1.1, Sep. 2000, 11 pages.
Carmona, David; "Programming the Thread Pool in the .NET Framework"; 'Online' Jun. 2002, pp. 1-17, XP002357234; retrieved on Dec. 1, 2005 from the Internet: URL: http://msdn.microsoft.com/library/default.asp?url=/library/en-us/dndotnet/html/progthrepool.asp>, pp. 1-7.
ComputerLetter, vol. 17, No. 23, Jul. 16, 2001, pp. 1-8.
ComputerLetter, vol. 17, No. 31, Sep. 24, 2001, pp. 1-6.
ComputerLetter, vol. 17, No. 35, Nov. 5, 2001, pp. 1-6.
Franklin et al., "Dissemination-Based Information Systems," IEEE Data Engineering Bulletin, vol. 19, No. 3, Sep. 1996, 9 pages.
Gribble, et al., "The Ninja Architecture for Robust Internet-scale Systems and Services;" Computer Networks; 2001; pp. 473-497; vol. 35; Elsevier Science B.V.
International DOI Foundation, "Introduction to the Digital Object Identifier," [online]. Apr. 1998 [retrieved on May 16, 2002]. Retrieved from the Internet: <doi.org/introduction.html.>, 4 pages.
Nagami et al., "Toshiba's Flow Attribute Notification Protocol (FANP) Specification," Apr. 1997, RFC 2129, Internet RFC/STD/FYI/BCP Archives [online], [retrieved on May 16, 2002]. Retrieved from the internet: <landfield.com/rfcs/rfc2129.html>, 16 pages.
Opyrchal et al., "Exploiting IP Multicast in Content-Based Published-Subscribe Systems," Proceedings of the IFIP/ACM International Conference on Distributed Systems Platforms (Middleware 2000), Apr. 2000, 23 pages.
"Persistence Counts", ComputerLetter, vol. 17, No. 23, Jul. 16, 2001, pp. 1, 5-7.
Reuters, "Reuters Market Data Systems and the Trading Solutions Architecture," Version 1.0, Jan. 12, 2001, 51 pages.
Ramamrithan et al., "Dissemination of Dynamic Data on the Internet," [online]. Powerpoint Presentation, Spring 2001, [retrieved on Feb. 6, 2002], 5 pages. Retrieved from the Internet <.cs.umbc.edu/courses/graduate/CMSC691T/spring.sub.-2001/rlist/amit.ppt>.
"Repackaging the Net", ComputerLetter, vol. 17, No. 35, Nov. 5, 2001, pp. 1-5.
"Reckoning with IP", ComputerLetter, vol. 17, No. 37, Nov. 19, 2001, pp. 1-6.
Soon Tee Teoh, "Combining Visual and Automated Data Mining for Near-Real-Time Anomaly Detection and Analysis in BGP," VizSEC/DMSEC'04, 10 pages, (Oct. 29, 2004).
Strom et al., "Gryphon: An Information Flow Based Approach to Message Brokering," International Symposium on Software Reliability Engineering '98, 1998, 2 pages.
Sturman et al., "Reflection in the Gryphon Message Brokering System," Reflection Workshop of the 13.sup.th ACM Conference on Object Oriented Program Systems, Languages and Applications (OOPSLA '98), 1998, 5 pages.
Welsh, Matthew D.; "An Architecture for Highly Concurrent, Well-Conditioned Internet Services"; URL: http://www.eecs.harvard.edu/{mdw/papers/mdw-phdthesis/pdf>, 2005, pp. 48-54, 101, and 113-114.
Written Opinion of the International Searching Authority for International Application No. PCT/US2005/029162, recorded Jan. 17, 2006, 7 pages.
Written Opinion of the International Searching Authority for International Application No. PCT/US2005/029021, recorded Dec. 14, 2005, 10 pages.

* cited by examiner

STORING STATE IN A DYNAMIC CONTENT ROUTING NETWORK

CROSS REFERENCE TO RELATED APPLICATIONS

This application is a Continuation under 35 U.S.C. § 120 of U.S. patent application Ser. No. 15/473,835, filed on Mar. 30, 2017, which is a continuation of U.S. patent application Ser. No. 13/941,131, filed Jul. 12, 2013, now U.S. Pat. No. 9,613,076, which is a continuation of U.S. patent application Ser. No. 11/515,366, filed Aug. 31, 2006, now U.S. Pat. No. 8,505,024, which is a continuation of U.S. patent application Ser. No. 10/213,269, filed Aug. 5, 2002, now U.S. Pat. No. 7,127,720, which is a continuation-in-part of U.S. patent application Ser. No. 10/017,182, filed Dec. 14, 2001, now U.S. Pat. No. 7,043,525, which claims priority from U.S. Provisional Application Nos. 60/280,627, filed Mar. 29, 2001; 60/279,608, filed Mar. 28, 2001; 60/278,303, filed Mar. 21, 2001; 60/276,847, filed Mar. 16, 2001; and 60/256,613, filed Dec. 18, 2000, all of which are hereby incorporated herein by reference.

BACKGROUND

Field

This disclosure pertains in general to transferring information through digital networks and in particular to storing the state of properties being updated by the transferred information.

Background

The Internet is a digital network of computers. An individual computer on the Internet is typically identified by an internet protocol UP) address. A computer on the Internet sends a packet of information to another computer by routing the packet to a logical port at the destination computer's IP address. The destination computer interprets the packet according to one of several possible protocols determined by the port to which the packet was sent.

The World Wide Web (the "Web") is a collection of technology and content available on the Internet that allows the content to be routed from server computers to particular destination computers. The Web includes a large number of web pages residing on many different servers. Web pages contain one or more files, or references to one or more files, specifying instructions for presenting the web page and content, such as text, images, applets, video, and/or audio.

Web pages use a variety of definitional and programming languages to control how information is presented. The most fundamental of these is the Hypertext Markup Language (HTML). HTML uses a system of "tags" to specify how content should be displayed. Recent advances in HTML introduce "style sheets" which help separate content information from display information. HTML has also been modified and extended to provide new capabilities. For example, Extensible Markup Language (XML) adds semantic content to web pages. In addition, Dynamic HTML (DHTML) adds some dynamic content to web pages.

A web page may also include one or more programs for controlling how the web page is displayed. For example, JAVA® applets and JAVASCRIPT® scripts may be used to control the display of a web page. In addition, DHTML uses scripts to control the dynamic content. Thus, a web page designer can use applets and scripts to produce animation effects or modify the display based on user interaction. For example, the designer can write a script that changes the color of a piece of text when a user clicks on a button.

Devices that display/execute web pages are often called "client devices" or simply "clients." Client devices include personal computers, web-enabled set-top boxes and televisions, cellular telephones, personal digital assistants and other handheld devices, and special-purpose web-browsing appliances. Client devices typically employ a program called a "web browser" for interpreting the HTML or other display instructions in the web page and displaying the content accordingly. Most web browsers include special functionality, such as a Java Virtual Machine, for executing JAVA® applets and/or other applets or scripts embedded in the web pages.

A client device specifies a web page or other document on the web using a Uniform Resource Locator (URL). A URL has the form "service://server/path/file." Here "service" refers to the protocol to be used, such as the file transfer protocol (FTP) or the hypertext transport protocol (HTTP). "Server" is the IP address of the server containing the page, and "path/file" specifies the particular web page on the server.

The Web suffers from a substantial limitation with respect to dynamically, updating content in a web page at a client device. The Web's predominant mode of operation is for a client device to first request a page from a server and then for the server to send the requested page to the client device. Once the server delivers the page to the client, it typically terminates its connection to the client, and does not retain any information about the client or the page that was sent. For this reason, servers are typically "stateless." As a result, client devices drive and control the flow of information around the Web. While client-side control is appropriate in some situations, it does not permit efficient updating of data at the client devices. For example, if a web page contains information that may change, such as the score of a baseball game or a stock quote, the server has no way to inform the client devices that are viewing the page of the change. Instead, the client devices must ask the server for the updated information. However, the client devices do not know when the information on the web page has changed, and thus do not know to ask for the update.

There are some simple web programming techniques that attempt to update content on client device-side web pages. One approach that web designers use is to rely on the client devices to periodically re-request web pages. This updating can be performed as the result of user action (such as pressing the "refresh" button) or can be automated to occur on a particular schedule (such as by using the HTML. Meta Refresh tag to cause the client device to request the page every 'X' seconds). Although this technique provides client devices with more up-to-date information, it is very wasteful of resources. In particular, the web server must re-send the page even if nothing has changed, and, even when something has changed, it must resend the entire web page rather than just the updated information, which may be only a very small part of the page. Further, attempting to reduce unnecessary requests by decreasing the request rate results in decreasing the currency of the data. This is an unalterable trade off in a client-driven approach.

The performance of automatic refreshing can be improved somewhat by putting information that may change in a separate frame from information that is less likely to change, and only refreshing the separate frame. A few web designers even write custom JAVA applets to limit refreshing to individual components on a page, such as the score of a soccer game. A willingness to go to such effort illustrates the serious drain of resources caused by frequent refreshing.

Nevertheless, even custom JAVA applets are not a meaningful attack on this problem. Custom applets require a large separate development effort for each item on each page that might need to be updated. More importantly, most custom applets still update content based upon client-driven requests, although it is possible to design an applet that accepts "pushed" messages. This solution is not scalable to provide updated information for large numbers of client devices and for large numbers of web pages.

Therefore, there is a need in the art for an efficient way to provide dynamic content to a web page at a client device. Preferably, a solution to this need will efficiently specify initial values for content provided to the clients, as well as enable efficient updates of the content.

BRIEF SUMMARY

According to one embodiment, a non-transitory computer readable storage medium having instructions stored thereon for updating a property of a live object at a client, the instructions when executed causes a processor to perform operations including identifying the live object at the client. The operations farther includes receiving an update message for the live object from an object state storage, where the object state storage is located on a dynamic content routing network, the update message is stored by an object ID associated with the live object, and the update message allowing the property to be updated for the live object at the client in real-time. The operations also include processing the update message.

According to another embodiment, a hardware-based dynamic content routing network includes means for maintaining mappings between clients and live objects using an object ID associated with the live objects. The dynamic content routing network further includes means for receiving an update message for an identified live object and means for routing the update message using the object II) associated with the live object to the clients according to the mappings.

According to another embodiment, a client module of an object state storage is configured to identify a live object at a client. The client module is further configured to receive an update message for the live object from storage, the update message is stored by an object ID associated with the live object, and the update message allowing the property to be updated for the live object at the client in real-time. The client module is further configured to transmit the update message for the live object to the client The features and advantages described in this summary and the following detailed description are not all-inclusive, and particularly, many additional features and advantages will be apparent to one of ordinary skill in the art in view of the drawings, specification, and claims hereof.

The figures depict an embodiment of the present disclosure for purposes of illustration only. One skilled in the art will readily recognize from the following description that alternative embodiments of the structures and methods illustrated herein may be employed without departing from the principles of the disclosure described herein.

DETAILED DESCRIPTION OF THE PREFERRED EMBODIMENTS

Figure 1:
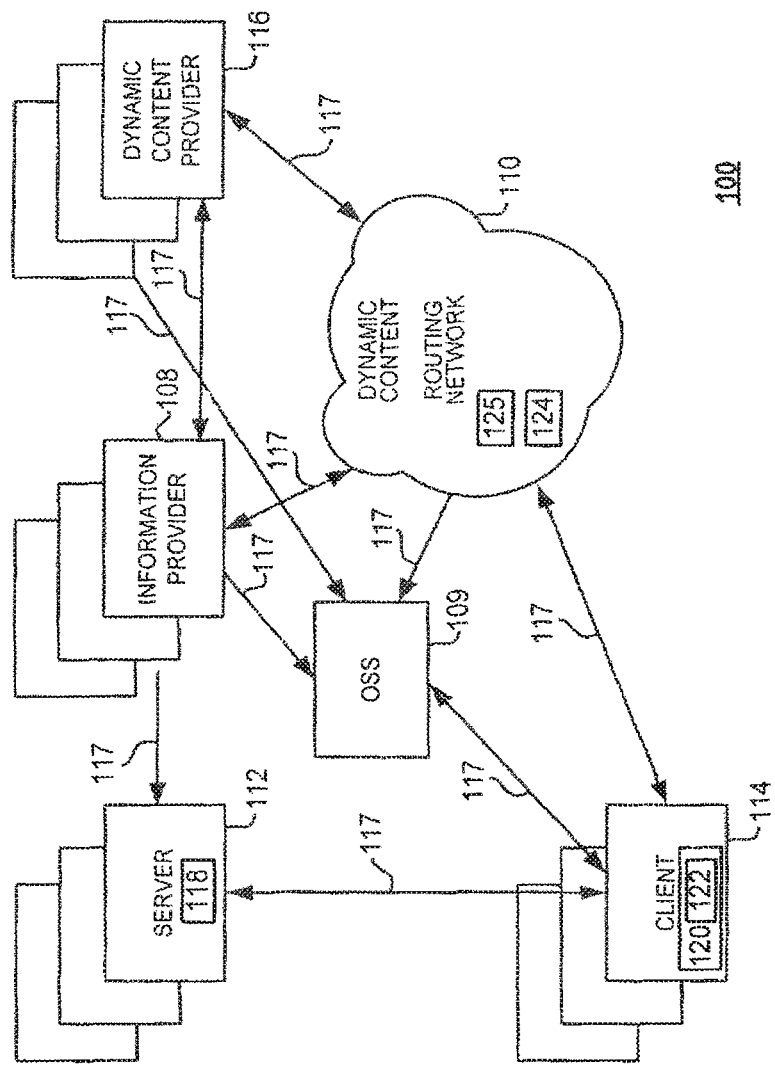
FIG. 1 is a high-level block diagram illustrating an environment containing a dynamic content routing network.

FIG. 1 is a high-level block diagram illustrating an environment 100 containing a dynamic content routing network 110 (hereafter referred to as the "routing network"). The environment 100 also contains a server 112 in communication with a client 114, an information provider 108, a dynamic content provider 116, and an object state storage (OSS) 109. Although a typical environment 100 will have hundreds of servers 112 and information providers 108, thousands (or even millions) of clients 114, and multiple dynamic content providers 116 and OSSs 109, FIG. 1 illustrates only one of each of these entities in order to enhance the clarity of this description.

The server 112, client 114, information provider 108, dynamic content provider 116, OSS 109, and routing network 110 are preferably in communication via conventional communications links 117 such as those comprising the Internet. The communications links 117 include known wired communications media, such as dedicated or shared data, cable television or telephone lines, and/or known wireless communications media, such as communications over the cellular telephone network using protocols such as the global system for mobile communications (GSM), code division multiple access (CDMA), time division multiple access (TDMA), etc.

In one embodiment, the entities may each be in communication with one or more Internet Service Providers (ISPs) (not shown) that provide each entity with access to other computers on the Internet. The addition, the server 112, client 114, information provider 1:08, dynamic content provider 116, OSS 109, and routing network 110 are preferably each identified by at least one Internet Protocol (IP) address such as "66.35.209.224." The IP address may also have one or more domain names associated with it, such as "bangnetworks.com." Alternative embodiments may use alternative addressing schemes and/or naming conventions instead of, or in addition to, those described herein. For example, embodiments wherein one or more of the clients are cellular telephones or other portable devices may rely on different addressing schemes.

Preferably, the information provider 108 provides web pages 118 or other representations of data to the server 112. The web pages 118 contain one or more "live objects," which are designated to be real-time dynamically-updateable objects. Each live object is identified by an object identifer, or object ID. Preferably, the web pages 118 do not specify initial properties for the live Objects and the information provider 108 does not need to modify the web pages when properties of the objects change. Moreover, if the updates to the properties of the live objects are supplied by a dynamic content provider 116, the information provider 108 does not even need to be notified when the properties change. The server 112 provides the web pages 118 to multiple clients 114.

The clients 114 preferably obtain the initial properties for the live objects identified by the object IDs on the web pages from the OSS 109. The clients 114 also contact the routing network 110 and register for update messages for the object IDs. The routing network 110, in turn, preferably maintains a registry indicating which clients have registered for which object IDs.

The information provider 108 and/or dynamic content provider 116 send update messages to the routing network 110. These messages can be sent any time the information provider 108 or dynamic content provider 116 wants to update a property of a live object. Each update message preferably identifies a live object and contains data for updating a property of the identified live object. The routing network 110 accesses the registry and determines which clients have registered for the identified object. Then, the routing network 110 routes the update message to the appropriate clients. Upon receipt of an update message, the clients 114 update the specified property of the live object.

In one embodiment, the information provider 108 and/or dynamic content provider 116 also send certain update messages to the OSS 109. In another embodiment, the routing network 110 routes certain update messages to the OSS 109. The OSS 109 preferably stores the update messages. The OSS 109 provides these update messages to the clients 114 to set the initial properties of the live objects on web pages 118 received by the clients.

The functionality of the OSS 109 advantageously relieves the information provider 108 and/or dynamic content provider 116 from managing the initial properties of the live objects. Without the OSS 109, the information provider 108 would either need to specify initial properties in the web pages it serves, or let the client 114 view the web pages without the properties until the client receives the update messages via the routing network 110. Given the OSS 109, the information provider 108/dynamic content provider 116 "knows" that the client 114 will have the most current properties for the live objects almost immediately upon loading the page.

The routing network 110 provides an efficient one-to-many mapping of objects to clients (and by inference of information, a many-to-many mapping of information providers 108/dynamic content providers 116 to clients) through object-based routing Messages provided by the information provider 108 and/or dynamic content provider 116 to the routing network 110 are not routed to the clients 114 based entirely on a specified destination; more specifically, they are not routed based on the IP address of the client, as in conventional IP routing schemes. Instead, the messages are routed based on the live objects referenced by the message.

The mapping and object-based routing provided by the routing network 110 allow the information provider 108 and dynamic content provider 116 to update properties of live objects at a dynamically changing cross-section of clients in real-time, without requiring the information provider or dynamic content provider to track the clients or web pages being viewed by the clients. The clients 114, in turn, do not need to have any a priori knowledge of object IDs—they "discover" which IDs they should register when they receives the web pages 118 from the server 112.

Object-based routing also allows information providers 108 to dynamically update content on web pages without requiring the clients 114 to re-request the content, and without requiring the information providers 108 or servers 112 to maintain connections with the clients. In this manner, significantly more clients can receive updated content from given information provider 108 than would be possible utilizing conventional client-side request-driven transmission control protocol/Internet Protocol (TCP/IP) connections between the clients and the server 112.

Turning now to the individual entities illustrated in FIG. 1, the server 112 is preferably a conventional computer system configured to act as a web server and serves web pages 118 and other data representations to clients 114. The web pages 118 provided by the server 112 are associated with one or more information providers 108.

An information provider 108 is an entity providing one or more web pages 118, information contained in web pages, and/or other representations of data served by the server 112. The information provider 108 preferably has a conventional computer system coupled to the Internet. In one embodiment, the server 112 is directly controlled by the information provider 108 (e.g., the server is physically located at the information provider and/or is dedicated to serving only the information provider's web pages). In this embodiment, the server 112 and information provider 108 can be treated as the same entity. In an alternative embodiment, the server 112 serves web pages from multiple information providers.

As is known in the art, the web pages 118 and other content on the server 112 are specified by uniform resource locators (URLs) having the form "service://server/path/web page." Typically, web pages 118 are obtained via the hypertext transport protocol (HTTP) and thus an exemplary URI, for retrieving the web page "b1.html" from the web server having the domain name "www.bangnetworks.com" is "http://www.bangnetworks.cominews/b1.html."

As used herein, a "web page" is a block of data available from the server 112. In the simplest case, a web page is a file written in the hypertext markup language (HTML). The web page may also contain or refer to one or more other blocks of data, such as other files, text, images, applets, video, and/or audio. In addition, the web page may contain instructions for presenting the web page and its content, such as HTML tags and style sheets. The instructions may also be in the Extensible Markup Language (XML), which is related to HTML and adds semantic content to web pages or the Dynamic HTML (DHTML), which adds some dynamic content to web pages. Additionally, the instructions may take the form of one or more programs such as JAVA® applets and JAVASCRIPT® and/or DHTML scripts.

As used herein, the phrase "web page" also refers to other representations of data served by the server 112 regardless of whether these data representations include characteristics of conventional web pages. These data representations include, for example, application programs and data intended for the web browser 120 or other application programs residing at the clients 114 or elsewhere, such as spreadsheet or textual (e.g., word processing) data, etc.

In a preferred embodiment, objects at the client, such as web pages and elements of web pages, can be designated as "live" by the information provider 108. Properties of a live object can be dynamically updated in real-time at the client 114 by the information provider 108 or another entity acting on behalf of the information provider. As used herein, an "object" is any datum or data at the client 114 that can be individually identified or accessed. Examples of objects include elements of web pages such as text characters and strings, images, frames, tables, audio, video, applets, scripts, HTML, XML, and other code forming the web page, variables and other information used by applets, scripts and/or code, URLs embedded in the web page, etc. Application and operating system constructs are also objects. For example, cells of spreadsheets, text in word processor documents, and title bars and messages displayed by the operating system or applications are objects. Preferably, multiple objects can be grouped together into a single, logical object. Thus, an object can be defined at any desired or useful level of granularity.

Since content on a web page is conceptualized and organized by "object," the present disclosure essentially abstracts web pages and web page content, and other modules and/or functionality at the client 114, away from the HTML code or other conventional representation. This abstraction allows the information provider 108 to update a property of an object without concern for the location, display format, or other specifics of how the data is being represented at the client 114.

Live objects have associated "properties" which include any modifiable data related to the object or referenced with respect to the object. The properties may or may not affect the visual representation of the object in the web page or other data representation. A property may affect an internal aspect of the object and, thus, a change to the property may not have any direct effect on a web page containing the object. For example, the property may affect whether particular aspects of the object are modifiable, how the object responds to user input or other stimuli, etc. Additionally, a property may also have a direct effect on how the object is displayed at the client 114. For example, the property may affect the content, color, typeface, size, formatting, or other attribute of text, images, or other data displayed by the object. Other properties may occupy parts of the spectrum between having no effect on the visible representation of the object and having a direct effect on the visible representation of the object. For example, a web page showing scores of football games may include a list of games and the current scores of the games as of the time the server 112 serves the web page. The list of games, subset of games to be displayed, and the scores of the games can be designated as live objects (or properties of a single live object) and updated as necessary or desired.

A property can also preferably include instantiating an instance of the object or invoking functionality of the object. For example, a property of a browser window object may include functionality for instantiating another browser window. This function can be invoked as a logical change to a property of the object. The second browser window can be referenced through the original browser window (i.e., object) or designated as a new live object.

An information provider 108 or other entity preferably updates a live object at a client 114 via an update message. In general, an update message identifies the live object and, if necessary, the property of the live object, and contains data for updating the property. In one embodiment, the data may be the actual value for the property or executable code for causing the object's property to be updated. For example, the data may be a simple numerical or textual value, e.g., "4," to which the property should be set, and/or the data may be JAVASCRIPT® code or a call to a JAVASCRIPT® function at the client that effects the desired change to the property of the object.

The update message preferably implicitly or explicitly identifies a handler at the client 114 for use in updating the live object's property. In one embodiment, the client 114 utilizes a default handler when the message implicitly specifies the handler (e.g. when the message does not identify a specific handler). In one embodiment, if the update message specifies the actual value for the property, a default handler generates JAVASCRIPT® code for changing the property to the specified value. If the data in the update message are JAVASCRIPT® code, the default handler does not perform any processing of the code. In either case, the default handlers preferably use LiveConnect to execute the JAVASCRIPT® code in a Java Virtual Machine (JVM) 122 at the client 114 and thereby update the property of the live object.

For certain objects and/or data types, the default handlers are not appropriate. In these cases, the message preferably explicitly identifies a handler for performing the update. For example, the message may explicitly specify a function to call on the data or the message may explicitly identify the environment in which the data should be executed. For example, the data in the update message may include code for execution by a software "plug-in" such as MACROMEDIA FLASH® and the message may explicitly identify FLASH as the handler.

The information provider 108 preferably designates an object as "live" by including a unique identifier for the object, the object ID, in the web page or other data representation provided to the client 114. In one embodiment, the information provider 108 encodes the object ID in an object's corresponding HTML "ID" attribute using the following HTML expression:

ID="elementIdentifier,"

where "elementIdentifier" is the object ID and is preferably a string. The string can encode any information desired by the information provider 108 or other entity establishing the object ID and in one embodiment is a simple textual and/or numeric identifier. In one embodiment, the information provider 108 begins the object ID with a predefined token, such as "Bang$," in order to distinguish live objects from other objects that happen to have defined ID attributes. For example, an object can have the object ID "Bang$elementIdentifier."

In the preferred embodiment, each information provider 108 optionally encodes a unique information provider ID in its object IDs in order to prevent naming collisions between the object IDs of different information providers. In one embodiment, the information provider ID is a textual and/or numeric identifier. The information provider 108 may specify the information provider II) and the object ID as part of a hierarchical namespace. For example, in one embodiment objects are named as follows: "$namespace1$ [namespace2$ . . . $namespaceN$]objectId," where "$namespace1" is the information provider ID and the "$" operates as the name separator and defines additional optional levels of a namespace hierarchy. One embodiment of the system 100 supports typical directory services functionality. For example, two dollar sign characters appearing together, "$$," refers to the top level of the namespace hierarchy.

Thus, the object ID for a live object is preferably formed from a combination of the predefined token, the information provider ID namespace, and a value assigned by the information provider 108. For example, the object ID for a live object representing the real time price of a stock having the symbol "BANG" might be: "Bang$$informationProviderID$equities$realtime$bang." In this example, "Bang$" is the predefined token that signifies a live object, "$informationProviderID" is the II) identifying the information provider, "$equities$realtime$" defines levels of a namespace hierarchy, and "bang" identifies the specific object.

In some embodiments and situations, the object ID utilizes relative names. For example, an information provider 108 referring to its own object IDs is implicitly in its own namespace. Accordingly, the information provider 108 does not need to include the information Provider ID in the object IDs it utilizes internally. In one embodiment, the information provider ID is not explicitly encoded into the object ID. Instead, the information provider ID is encoded elsewhere in the web page in order to provide scope to the page's object IDs.

In one embodiment, the object II) identifies a point (i.e., a node in a tree) in a Document Object Model (DOM) representation of a web page or other document at the client 114. The DOM is a platform- and language-neutral interface that represents a document as a hierarchy of objects. The DOM also provides an interface that allows programs and scripts to dynamically access and update properties of the objects. Object properties can be inherited by descendent objects.

In this embodiment, the client 114 preferably executes an update message in the context of the specified point in the DOM representation. The update may specify a change to a property of the object at the identified point. The update also may specify a change to a parent or descendent of the object at the identified point. In each case, the update is executed relative to the specified point in the DOM representation. In one embodiment, points in the DOM representation specify how to update properties of live objects located at those points. Thus, the same update may be interpreted differently depending upon the identified live object's location in the DOM representation.

For example, assume there is an object in the DOM representation identified as "window.document.frame[3].ObjectID." Also assume that the object has an "innerText" property located at "window.documentframe[3].ObjectID.innerText" that specifies the text displayed by the object. An update message can change the text displayed by the object by specifying "ObjectID" and the new value for the innerText property.

An advantage of utilizing object IDs to specify objects is that the information provider 108 or other entity providing the update message can access and change properties of objects without knowing the object's actual location in the DOM representation. Indeed, the object may be in different locations in different DOM representations and/or in multiple locations in the same DOM representation. In any of these cases, the update message will change the specified properties of all of the objects having the given object ID.

Depending upon the particular embodiment of the environment 100, the information provider 108 and/or the dynamic content provider 116 provides update messages to the routing network 110 and, optionally, to the OSS 109. The dynamic content provider 116 is preferably a conventional computer system operated by an entity that provides real-time information, such as stock prices and/or sports scores. In one embodiment, the information provider 108 receives updated properties for the live objects from the dynamic content provider 116 or another source (or generates the updated properties internally). Then, the information provider 108 sends an update message specifying the object ID and the change to the object property to the routing network 110 and OSS 109. In this embodiment, the dynamic content provider 116 may be absent from the environment 100.

In another embodiment, the dynamic content provider 116 provides the object IDs for live objects to one or more information providers 108 and the information providers 108 distribute the live objects to the clients 114. Then, the dynamic content provider 116 sends messages specifying the changes to the properties of the live objects to the routing network 110 and OSS 109. For example, the dynamic content provider 116 distributes an object ID associated with the score of a particular baseball game to the information providers 108. Then, the dynamic content provider 116 sends a message specifying the object ID and an update to a property of the object that controls the displayed score of the particular baseball game to the routing network 110 and OSS 109. These two embodiments are not mutually exclusive and, therefore, some updates may be provided by the information provider 108 while others are provided by the dynamic content provider 116.

The OSS 109 is preferably a conventional computer system adapted to receive and store update messages from the information provider 108, dynamic content provider 116, and/or routing network 110. The OSS 109 is also adapted communicate with clients 114 to determine which live objects are on web pages downloaded by the clients, and to provide the stored update messages for those live objects to the clients. In an alternative embodiment, the OSS 109 is adapted to communicate with the clients indirectly through the routing network 110. In one embodiment, the functionality of the OSS 109 is provided by a standalone server. In other embodiments, however, the functionality of the OSS 109 is integrated into the routing network 110, web server 112, information provider 108, and/or dynamic content provider 116.

The client 114 is a device that retrieves web pages 118 and/or other information from the server 112. In one embodiment, the client 114 is a conventional personal computer used by a person to access information on the Internet. In alternative embodiments, the client 114 is a different consumer electronic device having Internet connectivity, such as an Internet-enabled television, a cellular telephone, a personal digital assistant (PDA), a web browsing appliance, etc. The client 114 preferably, but not necessarily, has an associated display device.

The client 114 preferably executes a web browser 120, such as MICROSOFT INTERNET EXPLORER®, for retrieving web pages and displaying them on the display device. In embodiments where the client receives data representations from the server 112 other than conventional web pages, the web browser 120 does not necessarily share similarities with conventional web browsers. Preferably, the web browser 120 contains a JVM 122 for executing JAVA® applets and/or scripts. The web browser 120 also preferably contains Dynamic HTML capabilities, such as support for JAVASCRIPT® (or another scripting language, such as VBScript) and the Document Object Model (DOM), and enables communications between JAVA® and the scripting languages. In one embodiment, the web browser 120 supports the LiveConnect standard for enabling communication between JAVA® applets and scripts written in the supported scripting languages. The web browser 120 can also be extended through software plug-ins such as MACROMEDIA FLASH®, REAL NETWORKS REALPLAYER®, and/or APPLE QUICKTIME®. In alternative embodiments, the functionality of the JVM 122 and/or other aspects of the web browser 120 are provided by one or more other functional units within the client 114. The term "module" is used herein to refer to software computer program code and/or any hardware or circuitry utilized to provide the functionality attributed to the module. The web browser 120 and JVM 122 are examples of modules in the client 114.

In some embodiments, the client 114 does not necessarily have a display device, web browser 120 and/or other components associated with a typical consumer device. The client 114, for example, may be a dedicated purpose device having certain aspects of web connectivity such as an embedded HTTP client in a web-enabled appliance or iii a controller for an automobile, audio-visual equipment, or some other device.

A web page 118 provided from the server 112 to the client 114 preferably includes instructions for enabling the live objects on the web page. The instructions cause the client 114 to automatically and transparently (i.e., without user interaction) contact the routing network 110 and download an activation module 124 for activating the live objects. In one embodiment, the instructions comprise a URL specifying the location of the activation module 124 at the routing network 110. In an alternative embodiment, the client 114 obtains the activation module 124 from the server 112 or another source.

The activation module 124 preferably contains JAVA® instructions for execution by the NM 122. However, alternative embodiments of the module 124 may encode the instructions in the web page 118 and/or the activation module 124 using different languages and/or techniques. For example, the instructions and/or activation module 124 can be embedded in the web browser 120 or operating system, either as native code or as plug-ins. In these alternative embodiments, the web browser 120 does not have to download the activation module 124 from an external source.

The activation module 124 preferably provides the object IDs of the live objects on the web page 118 to the OSS 109. In response, the OSS 109 sends the activation module 124 the stored update messages for those live objects. The activation module 124 updates the properties of the live objects at the client 114 as specified by the update messages.

Contemporaneously with the interactions with the OSS 109, the activation module 124 preferably registers the object IDs with the routing network 110. The routing network 110 records the registrations in the registry 125. The client's registrations preferably remain in effect as long as the client 114 is displaying the associated web page 118, although other embodiments of the system 100 may use different criteria for determining when to terminate the client's registrations. The activation module 124 updates the live objects as specified by any subsequent update messages received from the routing network 110.

In an alternative embodiment, the OSS 109 directly interfaces with the routing network 110, and does not directly interface with the client 114. In this embodiment, the activation module 124 at the client 114 does not contact the OSS 109 to obtain the initial properties, but does register the object IDs with the routing network 110 as described above. The routing network 110, upon receiving new registrations from the client 114, contacts the OSS 109 in order to obtain the current update messages for the registered for objects. Then, the routing network 110 provides the update messages to the client 114 in the normal manner. This alternative embodiment is advantageous because the activation module 124 does not need to include separate functionality for interacting with the OSS 109.

Figure 2:
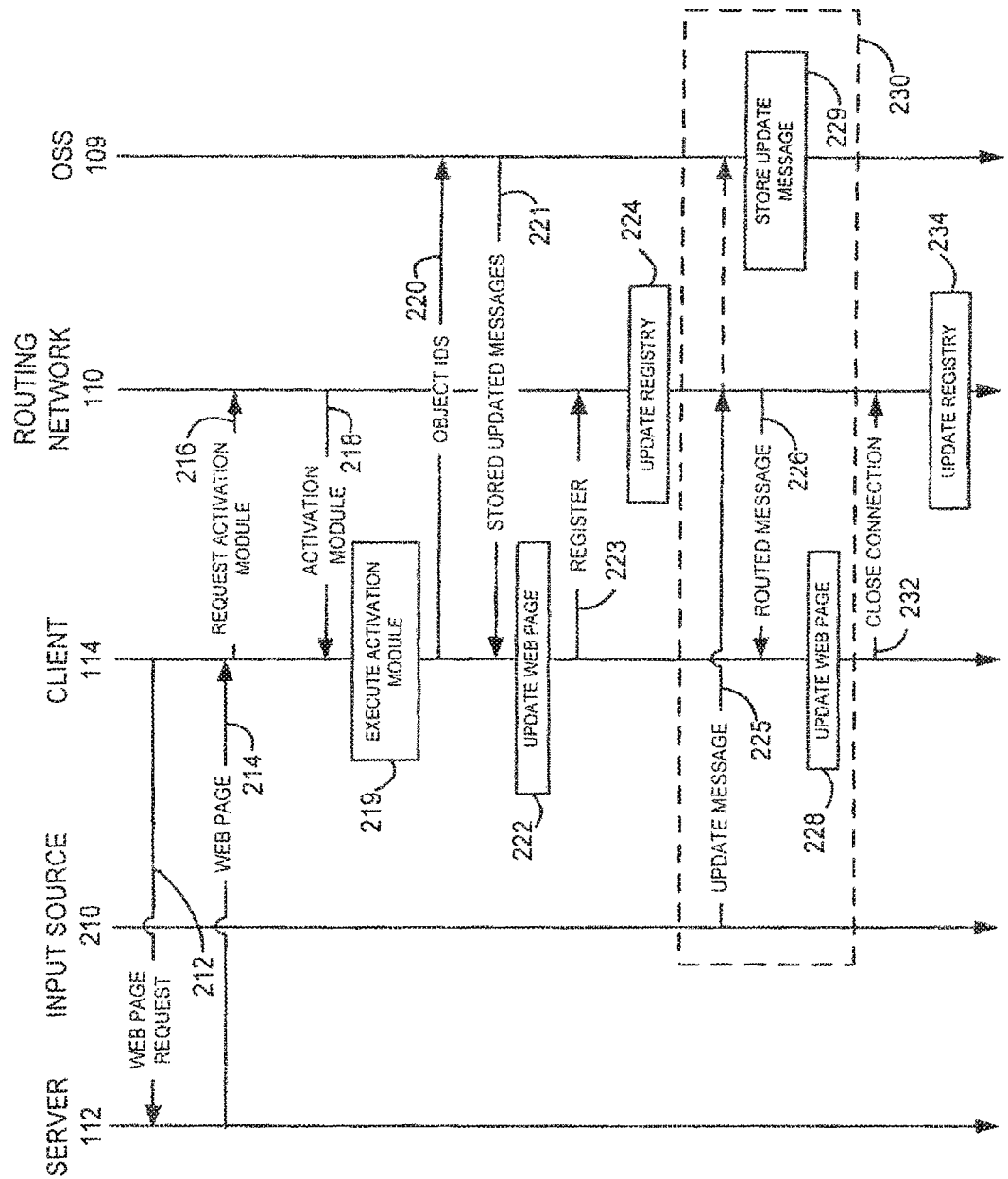
FIG. 2 is an interaction diagram illustrating interactions among a server, information provider, dynamic content provider, client, and routing network to update a property of a live Object on a web page.

FIG. 2 is an interaction diagram illustrating interactions among the server 112, information provider 108/dynamic content provider 116 (generically referred to as an "input source 210", client 114, routing network 110, and OSS 109 to update a property of a live object. Initially, the client 114 sends 212 a web page request to the server 112. In response, the server 112 provides 214 to the client 114 the web page containing or otherwise identifying the one or more live objects. Instructions encoded in the web page preferably cause the client 114 to transparently authenticate itself to, and request 216 the activation module 124 from, the routing network 110. In response, the routing network 110 sends 218 the activation module 124. The client 114 executes 219 the activation module 124, which identifies the object IDs of the live objects at the client.

In the embodiment where the client 114 directly interfaces with the OSS 109, the activation module 124 sends 220 the object IDs to the OSS 109. The OSS 109, in turn, authenticates the client 114/activation module 124 and provides 221 it with the stored update messages for the identified objects. The activation module 124 processes the received messages and updates 222 the properties of the live objects on the client's web page 118. The activation module 124 also registers 223 the object Ms with the routing network 110. The routing network 110 updates 224 its registry to identify the object IDs for which the client 114 has registered.

At some point, the input source 210 sends 225 an update message to the routing network 110 in order to change a property of a live object at the client 114. In one embodiment, the message from the input source 210 to the routing network 110 contains only a single object ID and an update to a property of the identified object. In another embodiment, the message contains multiple object IDs and the corresponding property updates. In this latter embodiment, the message may have an associated "Batch ID" that identifies the message as having multiple object IDs and updates. Preferably, the information provider 108 can include a batch ID in a web page 118 in the same manner as including an object ID. Likewise, the client 114 can preferably register for a batch ID with the routing network 110 in the same manner as an object II). Similarly, the OSS 109 can store batch IDs and batch messages in the same manner as non-batch IDs and messages. In fact, the batch ID can be the same as the object II) so that the client 114 registers for both batch and non-hatch messages by registering one ID. Alternatively, separate procedures can be established for registering batch messages. The client 114 preferably processes the component messages of a batch as if each message were delivered separately.

The routing network 110, in turn, routes 226 the message to each client 114 that has registered for the specified object ID, preferably by utilizing standard Internet communications protocols, such as IP addresses, etc. The activation module 124 at the client 114 processes the message and updates 228 the property of the identified live object. If live objects having the same object ID appear in multiple locations at the client 114 (e.g., at multiple locations on a web page being displayed at the client), the activation module 124 preferably updates each of the live objects having the specified ID. As a result, the routing network 110 allows live objects at the client 114 to be dynamically updated. Preferably, this routing and updating happens quickly enough to be considered "real-time" for the purposes of the input source 210.

The update message from the input source 210 to the routing network 110 is optionally sent 225 to the OSS 109. In one embodiment, the input source 210 selectively sends update messages directly to the OSS 109. In another embodiment, the input source 210 includes a flag or other data field with the update message that indicates whether the routing network 110 should send the message to the OSS 109. In yet another embodiment, the input source 210 or routing network 110 sends every update message to the OSS 109. Preferably, the OSS 109 stores 229 the update messages, although it may contain functionality for determining whether a particular message should be stored or discarded. Preferably, the OSS 109 overwrites a previously-stored update message for the same object (if one exists) with the new update message. In one embodiment, the input source 210, routing network 110, and OSS 109 contain functionality allowing the input source and/or routing network to route control messages to the OSS. These control messages may, for example, tell the OSS 109 to delete all update messages from its storage, delete certain update messages, etc.

This update process, indicated within the dashed box 230 in FIG. 2, can repeat an indefinite number of times and is fully asynchronous as to the information provider 210, client 114, and OSS 109. For example, the input source 210 may send regular update messages to the routing network 110 as the score of a sporting event changes or a stock price fluctuates, but may stop sending update messages once the sporting event ends or stock market closes. When the client 114 ends the display of a web page containing the live object, or otherwise no longer desires to receive update messages, the client preferably closes 232 the connection with the routing network 110. The routing network 110, in turn, updates 234 the registry 125 to remove the client's object registrations. In another embodiment, the client 114 sends messages to the routing network 110 that selectively register and/or de-register the client from one or more objects yet leaves the connection open in order to receive update messages pertaining to other objects.

In one embodiment, steps 220-226 occur in a different order or close enough in time that the client 114 receives the update message from the routing network 110 before it receives the update message for the same object from the OSS 109. In a preferred embodiment, the activation module 124 contains functionality enabling it to determine the source of the message and discard the message from the OSS 109.

In one embodiment the activation module 124 contains functionality enabling it to determine whether to retrieve an update message for an object ID from the OSS 109 or wait for an update message from the routing network 110. For example, the activation module 124 can make this determination based on information contained in the web page 118 downloaded from the server 112. Thus, this embodiment allows the information provider 108 or other entity providing the web page to specify whether the client 114 should retrieve the properties for an object from the OSS 109 or wait for an update message. This control preferably exists at the object level, meaning that the client might contact the OSS 109 for update messages for only a subset of the objects on a web page.

The activation module 124 does not necessarily apply the update messages received from the OSS 109 to the live objects on the web page 118. In one embodiment, the activation module 124 and OSS 109 include functionality wherein the activation module can request to receive the update messages in a string or similar format. The activation module 124 can analyze and process the update message string to determine whether to apply the updates, rather than simply applying the update messages to the live objects. In another embodiment, the activation module 124 alone contains functionality for generating a string from the update messages received from the OSS 109.

In one embodiment, the activation module 124 uses the OSS 109 to recover from an error or other fault at the client 114. If something happens at the client 114 and it loses all of the properties for the live objects on a web page, the activation module 124 can contact the OSS 109 and retrieve the current properties for the live objects. This situation might occur, for example, if the web browser 120 crashes and is restarted, but then loads the previously-displayed web page out of a local cache instead of from the server 112.

Figure 3:
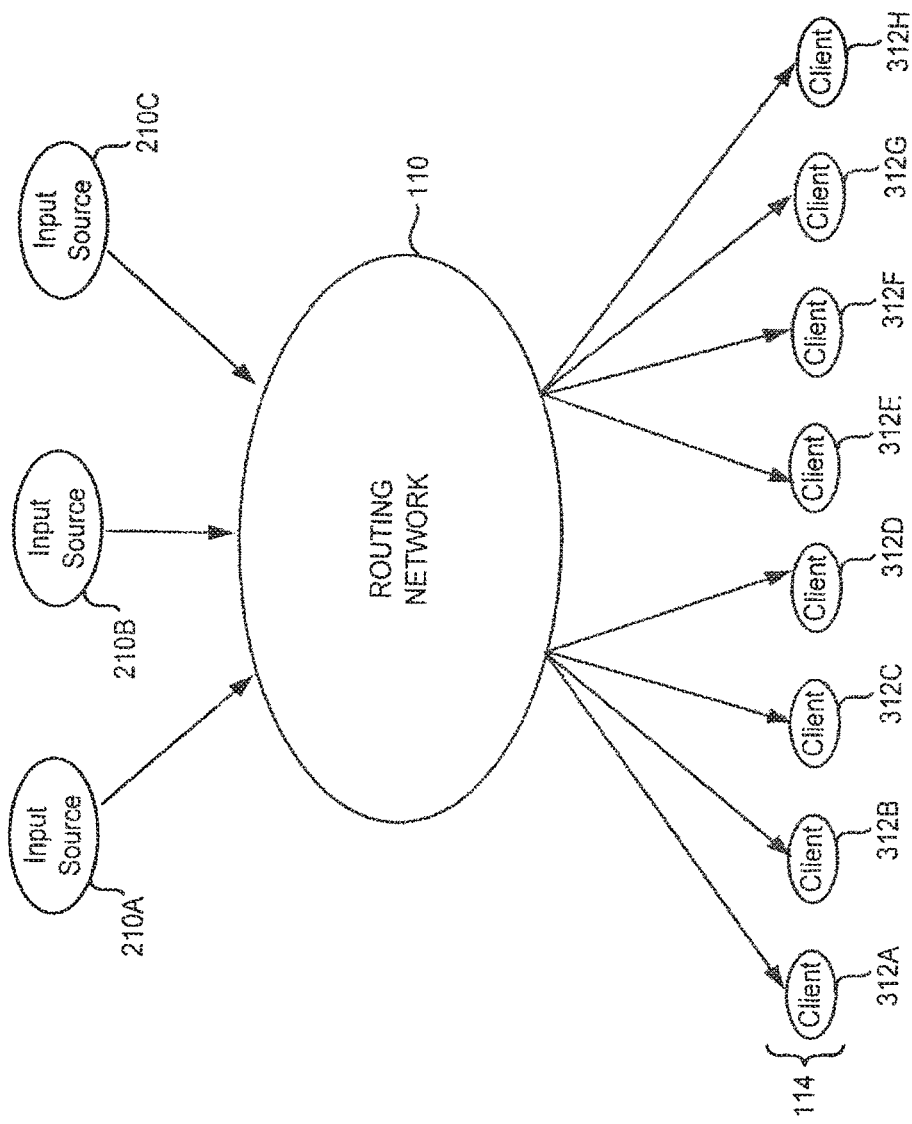
FIG. 3 is a high-level diagram graphically indicating the many-to-many mapping performed by the routing network.

FIG. 3 is a high-level diagram graphically indicating the many-to-many mapping performed by the routing network 110. Multiple input sources (labeled 210A-C) send update messages to the routing network 110. Each update message preferably specifies at least one object ID and an update to a property of the identified object. The routing network 110, in turn, selectively routes the update messages to the clients 114 that have registered for the given object ID from the given input source 210. In FIG. 3, assume for example that clients 312A and 312B have registered for a given object ID while the other clients have not registered for the object ID. Accordingly, the routing network 110 routes the update message to clients 312A and 312B, but does not route the message to clients 312C-312H.

Figure 4:
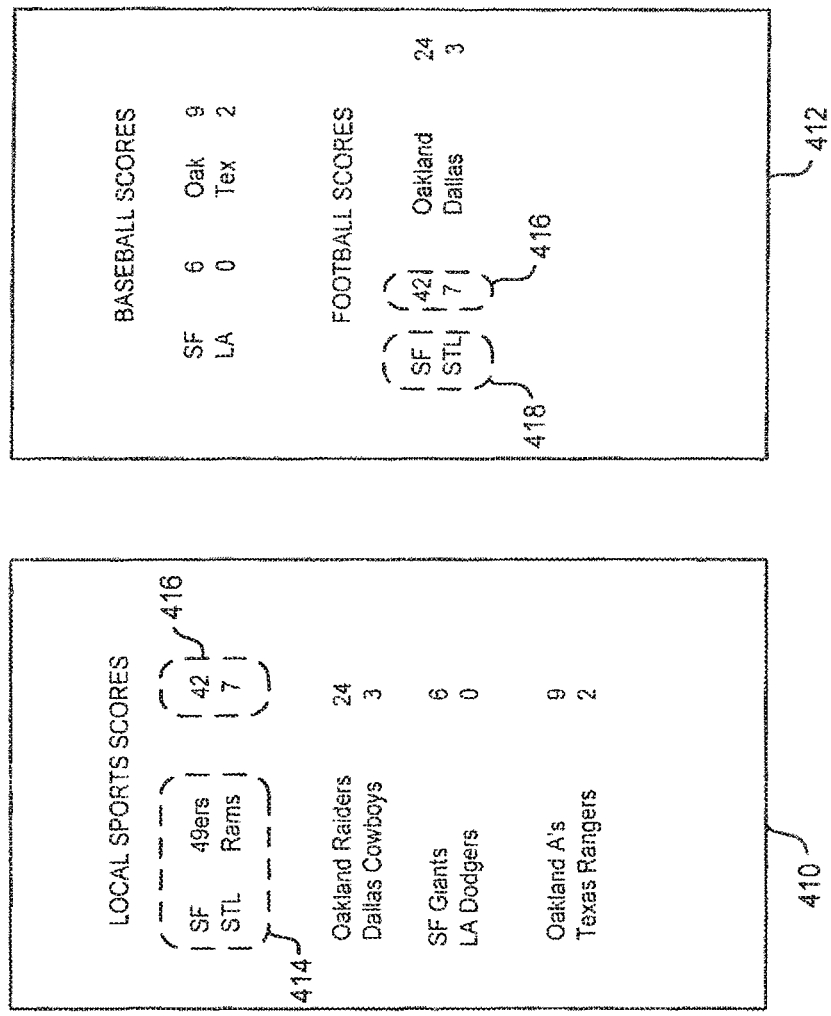
FIG. 4 illustrates two different web pages containing sports scores.

FIG. 4 illustrates an example of the capabilities of the dynamic content routing network 110. FIG. 4 illustrates two different web pages 410, 412 containing sports scores. Although the web pages are formatted differently, each page contains the same scores for two professional football games and two professional baseball games. Web page 410 contains all four games under the heading "Local Sports Scores" while web page 412 contains the baseball games under the heading "Baseball Scores" and the football games under the heading "Football Scores."

There are various ways to internally represent the games and scores in the web pages using live objects. In one embodiment, a "game" object is defined having properties for the two teams involved in the game and the score associated with each team. The game object is placed at a selected position in the web page and the properties of the object cause the information about the game to be displayed on the page. In another embodiment, "team" and "score" objects are defined, with the team object having a property defining the name of a team and the score object having a property defining a score. In this second embodiment, the team and score objects are placed at selected locations on the page so that the proper teams and scores are aligned when the page is rendered. In yet another embodiment, an object is defined having properties for the name of one team and a score associated with that team. Then, pairs of the objects are placed in the page in the proper alignment to indicate the games and scores. In another embodiment, an object is defined having properties specifying names of two teams and a separate object is defined having properties specifying two scores. In this last embodiment, the two objects are placed in the page so that the names of the teams align with the associated scores. Obviously, additional variations of these representations are possible.

Assume for the example of FIG. 4 that the names of teams in a game are specified by a "names" object having properties for the two team names and the scores in the game are specified by a "scores" object having properties for two scores. In web page 410, a names object 414 having properties set to identify the "SF 49ers" and the "STL Rams" is located directly under the "Local Sports Scores" heading. A scores object 416 having a property set to identify the score of the game as "42" to "7" is directly to the right of the names object 414. In web page 412, the properties of the second names object 418 identify the same game using slightly different terminology: "SF" and "STL." However, this names object 418 is aligned with the same scores object 416 as is utilized in web page 410.

Thus, the same scores object 416 is utilized in different positions in each web page 410, 412. In order to update the scare of the San Francisco 49ers vs. St. Louis Rams football game on both web pages, the input source 210 simply sends an update message to the routing network 110 specifying the object ID for the scores object 416 and the update to the score property. The routing network 110 routes the update message to the appropriate clients 114, and the clients update the appropriate score regardless of the particular page layout.

Figure 5:
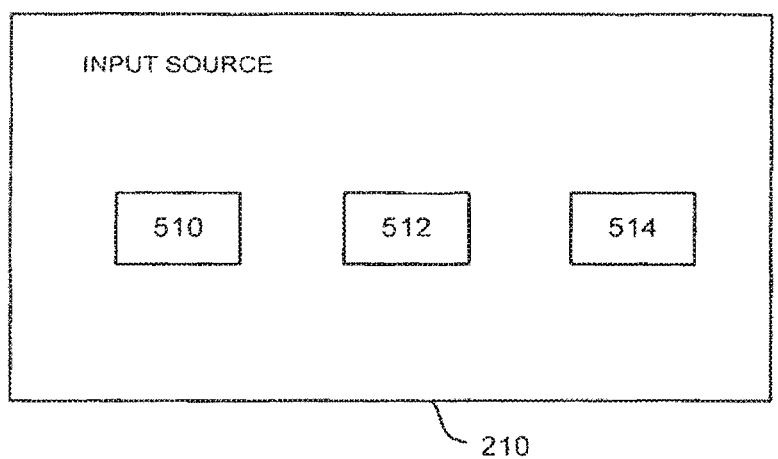
FIG. 5 is a block diagram illustrating an input source and the tools available to it for generating the update messages.

The input source 210, i.e., the information provider 108 and/or dynamic content provider 116 can use a variety of tools to generate the update messages. FIG. 5 is a block diagram illustrating an input source 210 and the tools available to it for generating the update messages. Other tools can be utilized in addition to or instead of the ones described herein.

Preferably, the tools allow the input source 210 to access an application programming interface (API) provided by the routing network 110 for accepting messages. In one embodiment, the messages sent by the input source 210 are in the same format as utilized by the activation module 124 at the client 114. In an alternative embodiment, the messages provided to the routing network 110 are in a different format and the routing network translates the messages into the format utilized by the activation module 124.

In one embodiment, the input source 210 utilizes a data pump module 510 to access the API. The data pump module 510 reads an extensible markup language (XML) file containing one or more object IDs and the new values for the identified objects at regular intervals and automatically generates API calls that send messages representing changes to object properties to the routing network 110. In another embodiment, the data pump module 510 is event-driven and reads the XML file in response to a change in the file or some other occurrence.

In another embodiment, the input source 210 utilizes a director console module 512 to access the API. Preferably, the director console module 512 presents an administrator with a graphical interface displaying the contents of the web page 118. For example, the administrator may use the director console 512 to edit textual data, images, and/or any objects or properties of objects on the web page. After editing, the administrator uses a "send update" button or similar technique to cause the director console module 512 to send messages for the changed objects and properties to the routing network 110 via the API.

In another embodiment, the information provider 108 and dynamic content provider 116 work together as the input source 210 by using a content management system module 514 to access the API. Preferably, the content management system module 514 resides at the information provider 108 and receives object property updates from the dynamic content provider 116. The content management system module 514 preferably updates the properties of the live objects in the web page 118 stored at the server 112 and also sends messages for the changed properties to the routing network 110. In this manner, the web page 118 at the server 112 and the web page displayed at the client 114 are updated almost simultaneously. In one embodiment, the dynamic content provider 116 sends the update messages to the routing network 110 instead of to the information provider 108. Embodiments of the system 100 can also utilize any, combination of the content management techniques described herein.

For example, the tools described above can generate a message having the following code for updating the text displayed by a score object to "2":

LiveObject score=new LiveObject("Bang$homeScoreID");
score.setProperty("innerText", "2").

This code sets the innerText property of the object having object ID "Bang$homeScoreID" to "2." The took use the API to pass this message to the routing network 110.

Figure 6:
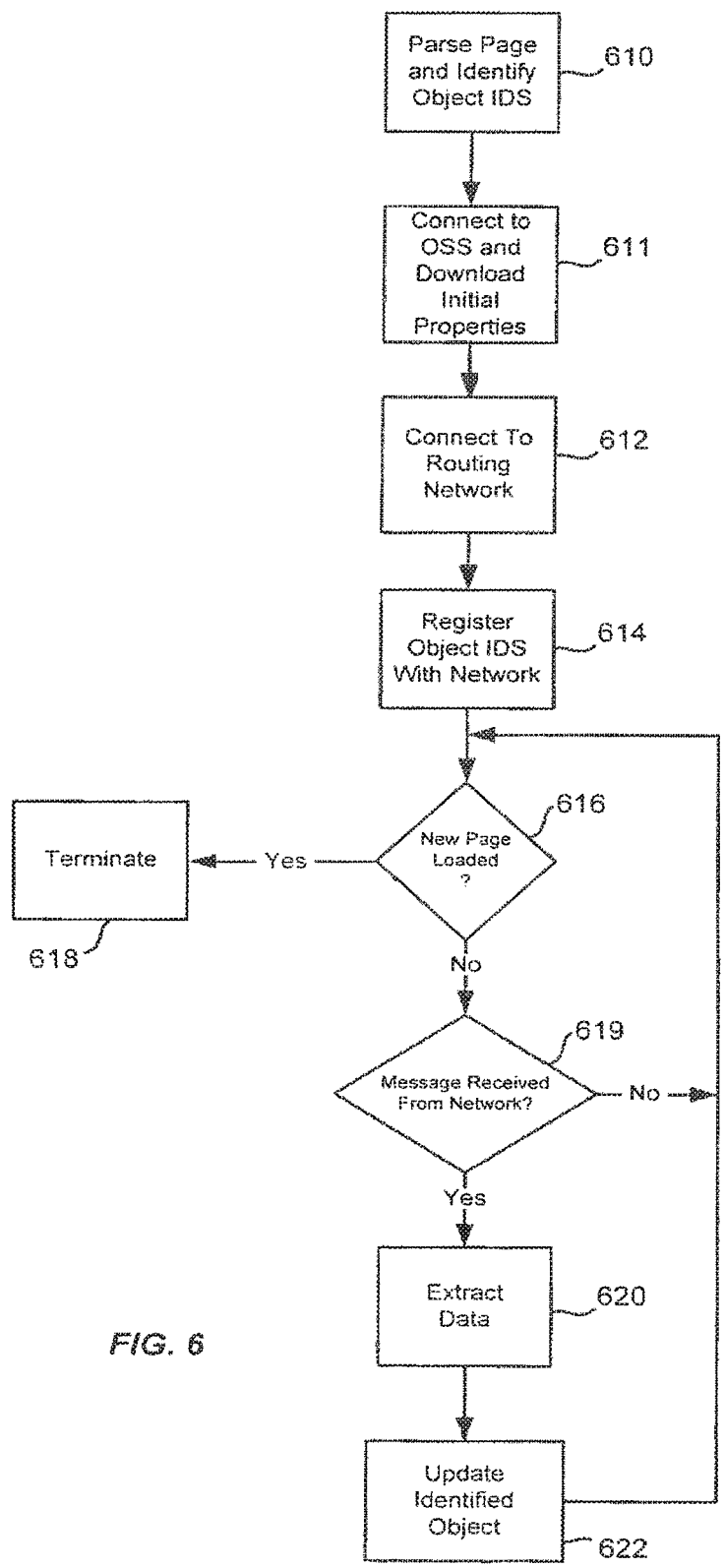
FIG. 6 is a flow chart illustrating the steps performed by an embodiment of activation module.

Turning now to the actions performed at the client. 114, FIG. 6 is a flow chart illustrating the steps performed by an embodiment of the activation module 124. Those of skill in the art will recognize that different embodiments may perform the steps of FIG. 6 in different orders. The activation module 124 generally performs four functions: interacts with the OSS 109, registers object IDs with the routing network 110, handles messages received by the client 114 from the OSS and network in order to update the properties of live objects, and controls communications between the client and the network.

The activation module 124 preferably parses 610 the web page 118 received from the server 112 and identifies the object IDs of the live objects. In an alternative embodiment, the activation module 124 identifies only a subset of the object IDs, such as the IDs of only live objects that are currently being displayed by the web browser 120. Alternatively, a list of object IDs may be pre-encoded in the web page in addition to the objects themselves, thereby enabling easy identification by the activation module 124. In yet another embodiment, a user of the client 114 selects the object IDs to register.

The activation module 124 preferably opens 611 a connection between the client 114 and the OSS 109 (or routing network 110, depending upon the embodiment). In some cases, the client 114 is located behind a firewall that puts a restriction on the types of connection requests the client can make. A firewall might, for example, block all non-HTTP traffic. For this reason, the activation module 124 preferably wraps the connection request in an HTTP header in order to get the request through the firewall. The activation module 124 uses the connection to send the OSS 109 a vector (e.g., a list or array) containing the identified object IDs. In order to accomplish this task through the firewall, the activation module 124 preferably puts the vector into a string, referred to as "object data," and then preferably creates an HTTP message to communicate the object data to the routing network 110. A schematic example is as follows:

```
POST/HTTP/1.1\r\n
Content-Length: <length of object data> \r\n
\r\n
<object data>
``` where <object data> is the object ID list. In response, the OSS 109 sends the client 114 the stored update messages for the identified objects and the connection between the client 114 and OSS 109 is then closed. The activation module 124 then updates the properties of the objects on the web page 118 as specified by the update messages.

The activation module 124 preferably opens 612 a connection between the client 114 and the routing network 110 and sends the object ID list using the same technique as with the OSS 109. When the routing network 110 receives the HTTP request, it extracts the object data and updates the registry 125 to indicate that the client 114 has registered for the identified objects.

If the web browser 120 loads 616 a new page, or otherwise terminates display of the objects on the initial page, the activation module 124 associated with the initial web page preferably terminates 618 the client's connection with the routing network 110. Those of skill in the art will recognize that this termination 618 can occur asynchronously with the other steps illustrated in FIG. 6. Thus, the location of steps 616 and 618 represents only one possible place in the sequence of steps where the termination may occur.

If the connection is not terminated, the activation module 124 preferably waits until it receives 619 a message from the routing network 110 specifying an object ID and an update to a property of the identified object. In one embodiment, this message is received as HTTP data. Upon receipt of the message, the activation module 124 preferably extracts 620 the object ID and update from the HTTP data. Then, the activation module 124 updates 622 the property of the identified object, or causes the object to be updated, as specified by the message.

The sequence of receiving messages 619, extracting data 620, and updating objects 622 is preferably repeated until a new page is loaded 616 or the connection with the routing network 110 is otherwise terminated. Although not shown in FIG. 6, in certain circumstances, such as when a user action with respect to the web page 118 activates a new live object, the activation module 124 may register new object IDs with the routing network 110 without first downloading and parsing a new page. In one embodiment, if the newly-loaded page contains live objects, then the process of downloading the activation module 124 and updating the objects as described by FIG. 6 is repeated. In an alternative embodiment, the activation module 124 remains active at the client 114 and, therefore, the client does not re-download the activation module from the routing network 110. Instead, the already-present activation module 124 performs the live-enabling process on the new page.

Figure 7:
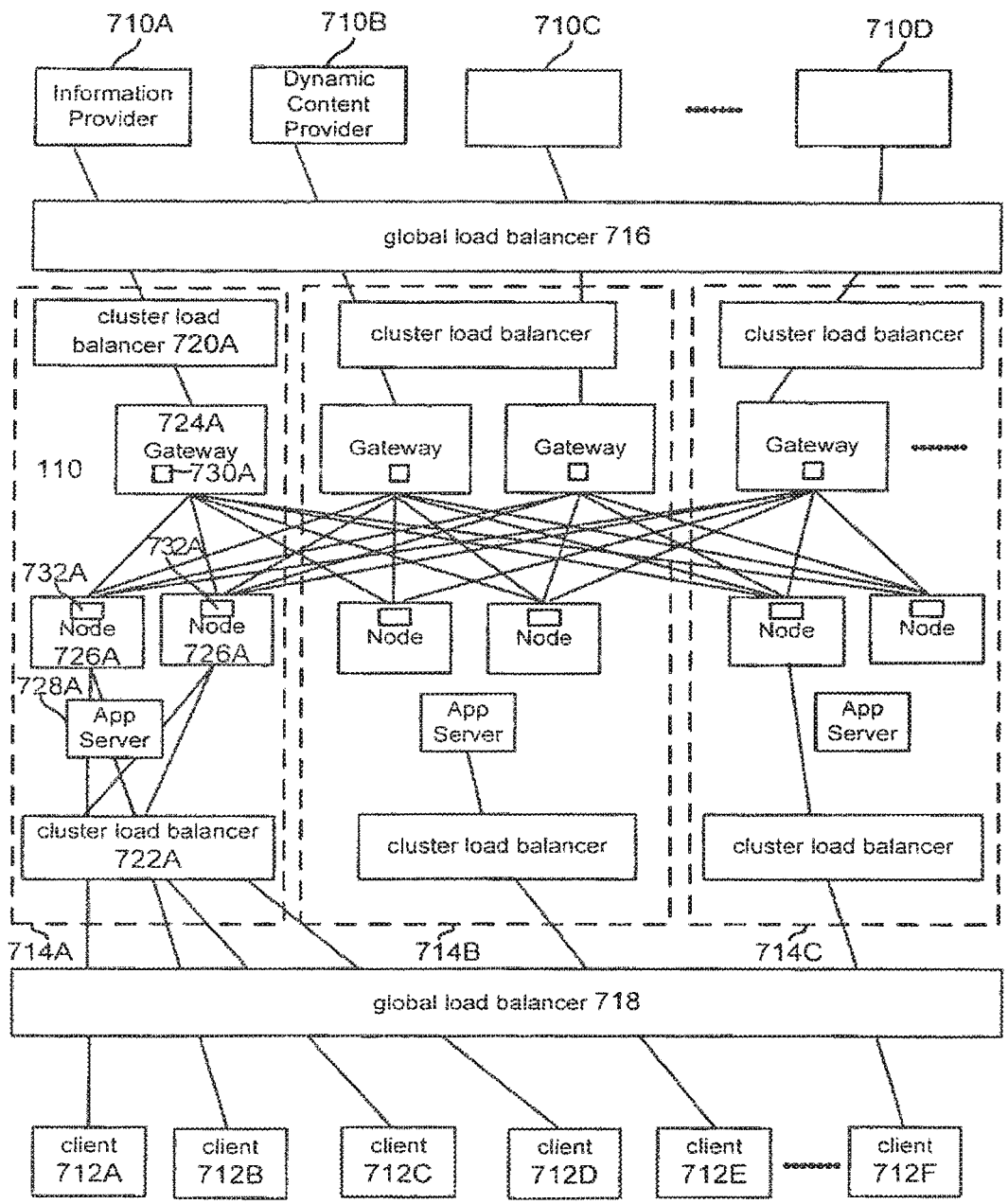
FIG. 7 is a block diagram illustrating a lower-level view of the routing network according to an embodiment.

FIG. 7 is a block diagram illustrating a lower-level view of the routing network 110 according to an embodiment. Those of skill in the art will recognize that there are many alternative ways to implement the functionality of the routing network 110. FIG. 7 illustrates multiple input sources (labeled 710A-D) representative of sources providing messages to the routing network 110, such as an information provider 710A and a dynamic content provider 710B. FIG. 7 also illustrates multiple clients (labeled 712A-F) representative of the many clients in communication with the routing network 110 at any given instant.

Internally, the routing network 110 is preferably divided into one or more clusters 714. In FIG. 7, the routing network 110 has three clusters 714A, 714B, 714C, although the number of clusters can vary depending upon the processing needs of the network. An input-side global load balancer 716 preferably routes messages from the input sources 710 to the clusters 714. Similarly, a client-side global load balancer 718 preferably routes connection requests from the clients 712 to the clusters 714. The load balancers 716, 718 are designed to ensure that load is distributed among the clusters 714 according to a predetermined heuristic. For example, the load may be distributed evenly among the clusters 714 or a more powerful cluster may be distributed a majority of the load. In one embodiment, one load balancer performs the functions of the input-side 716 and client-side 718 load balancers and utilizes conventional Domain Name System- (DNS-) based load balancing.

Each cluster 714, of which cluster 714A is representative, preferably contains an input-side cluster load balancer 720A and a client-side cluster load balancer 722A. The cluster load balancers 720A, 722A function similarly to the corresponding global load balancers 716, 718 in that the input-side cluster load balancer 720A balances and routes incoming messages among one or more gateways 724A and the client-side cluster load balancer 722A balances and routes incoming connection requests among one or more nodes 726A and application servers 728A.

In one embodiment, the functionality of the two client-side cluster load balancers 720A, 722A is provided by one component. This single-component load balancer initially determines whether an incoming request is from an input source 710 seeking to send a message to a gateway 724A, a client 712 seeking a connection to a node 726A, or a client seeking a connection to an application server 728A. Then, the load balancer routes the messages/connection requests among the gateways 724A, nodes 726A, and application servers 728A within the cluster 714. In one embodiment, the single-component load balancer provides layer seven load balancing (i.e., load balancing at the application layer). Preferably, the load balancing for the nodes 726A and application servers 728A are performed by the same component since, for security reasons, most client web browsers only permit an application (e.g., the activation module 124) to transparently connect to the location from which the application was downloaded.

Alternative embodiments of the routing network 110 may combine the global 716, 718 and cluster 720A, 722A load balancers and/or incorporate the functionality of the load balancers into different components within or outside of the clusters 714. In addition, alternative embodiments may omit one or more of these load balancers. For example, having different clusters 714 serve different customers might obviate the need for the global load balancers 716, 718.

The gateways 724A in the cluster 714 receive the messages from the input sources 710 and direct the messages to the appropriate node or nodes 726A. In one embodiment, each gateway 724A maintains a persistent TCP connection to every node 726 in every cluster 714 and directs every message to every node. Therefore, although a gateway 724A is located inside a cluster 714A and receives connections via the cluster's input-side load balancer 720A, the gateway's scope spans the entire routing network 110. This broad scope allows messages from any input source to reach any client 712.

In an alternative embodiment of the routing network 110, each gateway 724 maintains a persistent TCP connection to all nodes 426 in the same cluster 714 and at least one connection to at least one gateway in each of the other clusters. This embodiment reduces the number of simultaneous TCP connections maintained by each gateway 724. In another alternative embodiment, each cluster 714 also includes a gatekeeper (not shown in FIG. 7) that maintains connections with the gateways 724 of other clusters. A gateway 724 forwards messages to the gatekeeper, which then distributes the messages to the gateways of other clusters 714.

Since a gateway 724 does not control the rate at which it receives messages from input sources 710, it is possible for the gateway to receive messages faster than it can process them (i.e., send the messages to the nodes). Therefore, each gateway 724 preferably maintains a queue 730 of messages that have been received but not yet processed in order to avoid losing messages. In one embodiment, the gateway 724 drops messages if the queue 730 becomes too long. In another embodiment, the gateway 724 utilizes priorities assigned to certain messages or input sources to determine which messages to drop.

The nodes 726 preferably transmit messages received from the gateways 724 to the clients 712 that have registered in the object IDs identified by the messages. If no clients 712 have registered the object ID specified by a message, the node preferably ignores the message. A node 726 preferably maintains an instance of the registry 125 as a hash table 732 containing the object IDs registered by clients 712 connected to the node. In one embodiment, the hash table 732 associates each object ID with a linked list containing one entry for each client 712 that has registered for that object ID. Each entry in the linked list preferably contains a pointer to a socket representing the connection to the corresponding client 712. As is known in the art, the pointer to the socket, typically called a "file descriptor," represents an address to which the node can write in order to send the message to the corresponding client. Preferably, the node 726 adds to the hash table 732 and/or linked list every time a client 712 registers an interest in an object and deletes the corresponding entry from the hash table and/or linked list when the client disconnects from the node or otherwise indicates that it is no longer interested in a particular object.

Alternative embodiments utilize other data structures in addition to, or instead of, the hash table 732 and linked list, and/or may utilize different data within the data structures. For example, one embodiment of the routing network 110 has a hierarchy of nodes within each cluster 714. Different nodes in the hierarchy may handle messages received from certain input sources 210, or process messages sent to different clients 712. In this embodiment, the linked lists may point to nodes lower in the hierarchy, instead of to sockets leading to the clients 712. Another embodiment lacks the node hierarchy, yet assigns certain nodes to certain input sources 210 or clients 712.

The application server 728 within each node 714 preferably serves the activation module 124 to the clients 712 in response to client requests. In addition, the application server 728 serves any other modules that may be required or desired to support the environment 100. In an alternative embodiment of the routing network, a single application server 728 fulfills all of the client requests. This application server 728 may be within a certain cluster 714 or independent of the clusters. However, this single-application-server embodiment is less desirable because it lacks redundancy.

In one embodiment, at least one of the nodes 726 is in communication with the OSS 109 in order to provide the update messages to the OSS. In another embodiment, OSS functionality is provided by the node 726 itself.

Preferably, the routing network 110 utilizes conventional single-processor computer systems executing the Linux operating system. (OS). Preferably, each component of the routing network 110 is implemented by a separate, dedicated computer system in order to enable the separate optimization of the components. The input/output (I/O) functionality of the QS is preferably enhanced through the use of a non-blocking OS package such as NBIO available from the University of California, Berkeley, Calif. Based on the assumption that connections with the nodes 728 are long-lived, the OS is preferably configured to not allocate resources toward monitoring idle connections. Instead, the well-known /dev/poll patch is preferably applied to the OS in order to provide advanced socket polling capabilities.

Moreover, the TCP/IP stack in the OS is preferably optimized in order to quickly output messages. In one embodiment, the retransmit timer in the stack is reduced from 200 ms to 50 ms. This timer determines how long the stack waits for an acknowledgement (ack) that a sent packet was received. Due to the way the Linux kernel implements the retransmit timer, the kernel will not send pending outbound packets (even if the ack has been received) until the initial retransmit timer has expired. Reducing the retransmit timer value minimizes the effect of this delay. If an ack is not received before the retransmit timer expires, an embodiment increases the retransmit value for the affected TCP connection and the unacknowledged packet is retransmitted. In addition, the TCP/IP stack preferably utilizes Nagle's algorithm functionality to concatenate a number of small messages into a larger message, thereby reducing the number of packets sent by the routing network 110.

Figure 8:
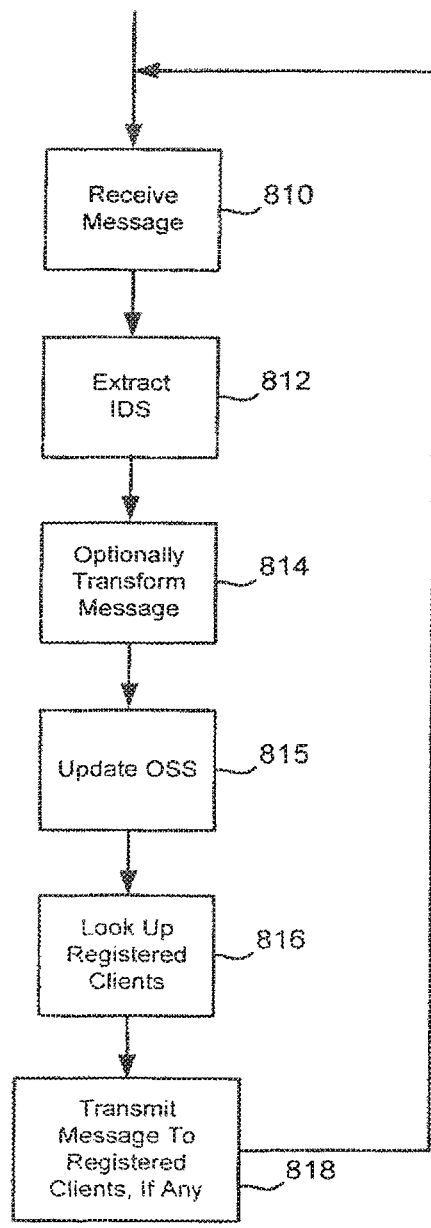
FIG. 8 is a flow chart illustrating steps performed by a node in a cluster to perform object-based routing of a message received from an input source via the gateway.

FIG. 8 is a flow chart illustrating steps performed by a node 726 in a cluster 714 to perform object-based routing of a message received from an input source via the gateway 721. Initially, the node 726 receives 810 the message from an input source 710. The node 726 extracts 812 the object ID front the message. In addition, the node 726 optionally transforms 814 the message to convert it from the format utilized by the input source 710 into the format utilized by the activation module 124 at the client 712. As described above, in one embodiment the message format utilized by the input source 710 is identical to the message format utilized by activation module 124. In this embodiment, therefore, the node 726 does not need to transform the message. In an alternative embodiment wherein the input source 710 and activation module 124 utilize different message formats, the node 726 preferably transforms the message. The node 726 optionally sends 815 the message to the OSS 109 (this step may also be performed before the message is transformed 814, depending upon the embodiment). The node 726 looks up 816 the hash table entry corresponding to the extracted object and information provider IDs to determine the linked list of clients 712 that have registered in the object referenced by the message. Finally, the node 726 transmits 818 the message to each of the registered clients 712. In an alternative embodiment, the node 726 optionally transforms the message after, as opposed to before, looking up the registered clients in the hash table. Transforming the message at this latter stage enables the node 726 to transform the message according to the specific requirements of the registered clients 712.

Figure 9:
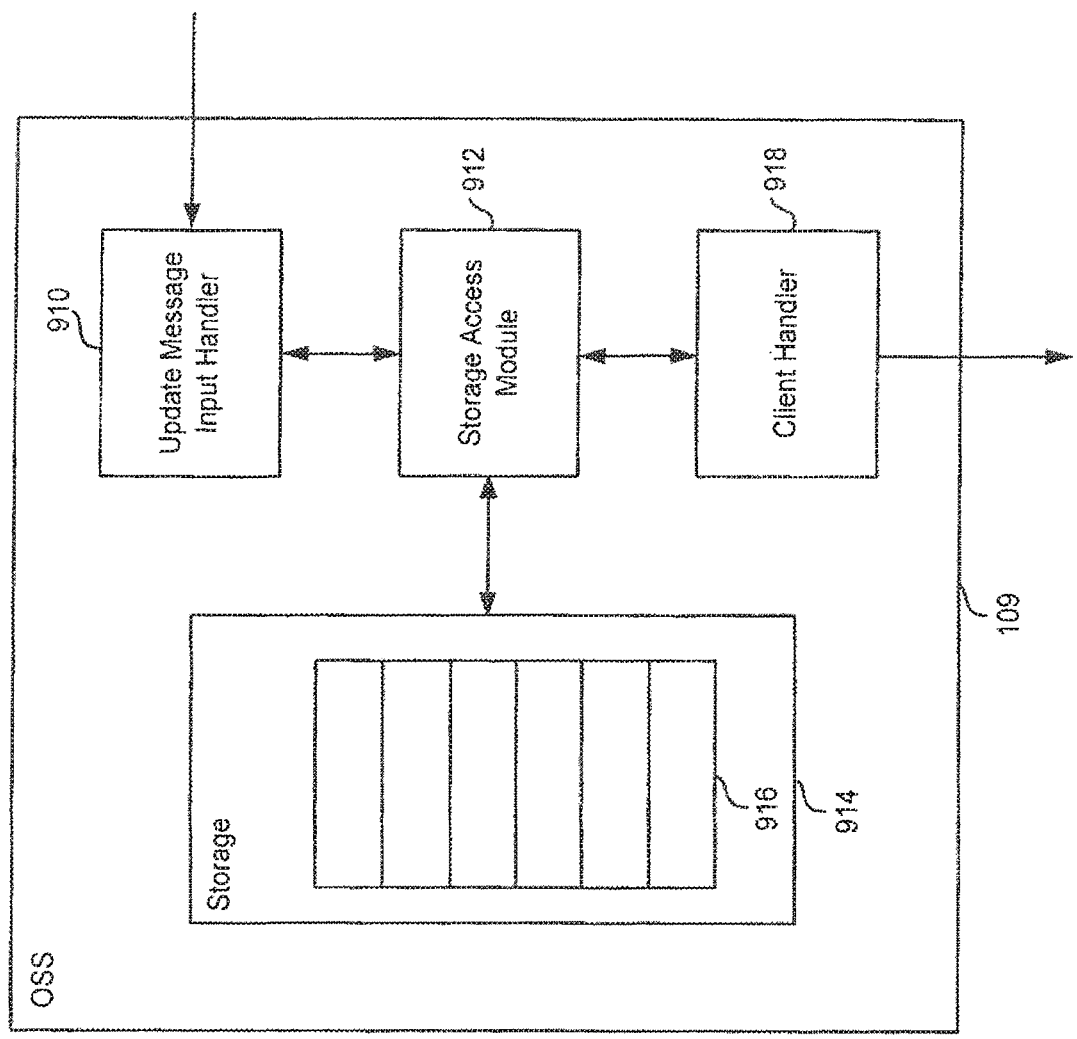
FIG. 9 is a high-level block diagram illustrating the components within the object state storage according to an embodiment.

FIG. 9 is a high-level block diagram illustrating components within the OSS 109 according to an embodiment. Input messages from the input source 210 and/or routing network 110 are received by an update message input handler module (the "input handler") 910. The input handler 910 preferably verifies that the update messages are from a valid source and performs any processing of the update message that may be necessary or desired depending upon the embodiment. For example, in one embodiment the input source 210 provides update messages for ail objects to the OSS 109, but only certain messages are flagged to be stored by the OSS. The input handler 910 preferably analyzes the flag to determine whether to store or discard the message. The input handler 910 also preferably processes any control messages received by the OSS 109.

The input handier 910 preferably provides messages destined to be stored to a storage access module 912. The storage access module 912 preferably reads, writes, and modifies update messages in a storage module 914. Preferably, the storage module 914 includes a conventional random access memory (RAM) for providing fast access to data stored therein. The RAM preferably includes a hash table or other data structure 916 adapted to provide fast access to update messages for specified object IDs. Accordingly, the storage access module 912 is preferably adapted to apply a hashing function to object IDs in order to quickly locate entries for the object IDs in the storage module 914. In one embodiment, the storage module 912 includes a conventional magnetic memory for storing update messages in addition to, or instead of the RAM, and/or utilizes a conventional database in addition to, or instead of the hash table.

In one embodiment, the input handler 910, storage access module 912, and/or storage module 914 are adapted to store update message histories. For example, the OSS can controllably store the last X update messages for one or more objects. The message histories may be useful for error recovery, testing, and/or accounting purposes. Similarly, in one embodiment the input handler 910, storage access module 912, and/or storage module 914 are adapted to support time-to-live (TTL) functionality. TTL specifies how long a specified update message should be deemed "valid" and stored by the OSS 109. Thus, an input source 210 can use TTL functionality to ensure that the OSS 109 does not store and provide stale update messages.

A client handler module 918 preferably interacts with the storage access module 914 and the clients 114. In one embodiment, the client handler module 918 receives the object data from a client, extracts the object IDs, and provides the object IDs to the storage access module 912. The storage access module 912, in turn, provides the update messages for the identified objects to the client handler 918, which then sends the update messages to the client 114.

In one embodiment, the client handler 918 also performs authentication and authorization to ensure that only authorized clients 114 receive update messages from the OSS 109. In one embodiment, the clients 114 present credentials, such as login/password pairs, to the client handler 918. In another embodiment, the authentication performed by the client handler 918 relies at least partly upon the authentications between the clients 114 and the nodes 732. For example, in one embodiment a node 732 gives a token to the authenticated client 114 that the client presents to the client handler 918.

The above description is included to illustrate the operation of the preferred embodiments and is not meant to limit the scope of the disclosure. The scope of the disclosure is to be limited only by the following claims. From the above discussion, many variations will be apparent to one skilled in the relevant art that would yet be encompassed by the spirit and scope of the disclosure.

We claim:

1. A method to update a property of a live object at a client, the method comprising:
    identifying the live object at the client;
    receiving object data associated with the live object;
    extracting an object ID from the object data, wherein the object ID identifies a point in a document object model;
    receiving an update message for the live object from an object state storage, the update message comprising data that, upon processing, causes a change to the a property of the live object being displayed at the client in real-time, wherein the object state storage is in communication with a dynamic content routing network, and is configured to store the update message at least in part using the object ID and to verify that the update message is from a valid source; and processing, in response to verification that the update message is from a valid source, the update message.

2. The method of claim 1, wherein the object state storage is in communication with the dynamic content routing network via the Internet.

3. The method of claim 1, further comprising, transmitting the update message to the client.

4. The method of claim 1, further comprising, authenticating the client.

5. The method of claim 4, wherein the authenticating the client comprises receiving client's credentials from the client.

6. The method of claim 4, wherein the authenticating the client comprises receiving a token from the client, wherein the token represents the client's successful authentication with a node within the dynamic content routing network.

7. The method of claim 1, wherein the update message is stored in a data structure configured to provide fast access.

8. The method of claim 1, further comprising, receiving a second update message, the second update message comprising data that, upon processing, causes another change to the property of the live object.

9. The method of claim 1, wherein the object ID further comprises a provider ID.

10. A hardware-based dynamic content routing network, comprising:
    at least one processor configured to:
    identify a live object at a client;
    receive object data associated with the live object;
    extract an object ID from the object data, wherein the object ID identifies a point in a document object model;
    receive an update message for the live object from an object state storage, the update message comprising data that, upon processing, causes a change to a property of the live object being displayed at the client in real-time, wherein the object state storage is in communication with the a dynamic content routing network and is configured to store the update message at least in part using the object ID and to verify that the update message is from a valid source; and process, in response to verification that the update message is from a valid source, the update message.

11. The hardware-based dynamic content routing network of claim 10, wherein the object state storage is in communication with the dynamic content routing network via the Internet.

12. The hardware-based dynamic content routing network of claim 10, wherein the at least one processor is further configured to:
    retrieve the update message from a storage device based on the object ID.

13. The hardware-based dynamic content routing network of claim 10, wherein the update message is stored in a data structure configured to provide fast access.

14. The hardware-based dynamic content routing network of claim 10, wherein the at least one processor is further configured to determine whether to store the update message.

15. The hardware-based dynamic content routing network of claim 10, wherein the object ID further comprises a provider ID.

16. The hardware-based dynamic content routing network of claim 10, wherein the at least one processor is further configured to authenticate the client.

17. The hardware-based dynamic content routing network of claim 10, wherein the at least one processor is further configured to authenticate the client by receiving client's credentials from the client.

18. The hardware-based dynamic content routing network of claim 17, wherein the at least one processor is further configured to receive tokens from the client, wherein the tokens represent the client's successful authentication with a node.

* * * * *